United States Patent
Lin et al.

(10) Patent No.: US 10,654,724 B2
(45) Date of Patent: May 19, 2020

(54) POLYALUMINUM SALTS AND THEIR USES IN PREPARATION OF HIGH-PURITY COLLOIDAL ALUMINUM-SILICA COMPOSITE PARTICLES AND ZEOLITES

(71) Applicant: Ecolab USA Inc., St. Paul, MN (US)

(72) Inventors: Wenyong Lin, Rolling Meadows, IL (US); Francois Batllo, Burr Ridge, IL (US); Shiby John, Aurora, IL (US); Michael Romba, Joliet, IL (US)

(73) Assignee: Ecolab USA Inc., St. Paul, MN (US)

( * ) Notice: Subject to any disclaimer, the term of this patent is extended or adjusted under 35 U.S.C. 154(b) by 173 days.

(21) Appl. No.: 15/827,396

(22) Filed: Nov. 30, 2017

(65) Prior Publication Data
US 2018/0155203 A1    Jun. 7, 2018

Related U.S. Application Data

(60) Provisional application No. 62/473,598, filed on Mar. 20, 2017, provisional application No. 62/429,324, filed on Dec. 2, 2016.

(51) Int. Cl.
*C01B 33/143* (2006.01)
*C01B 39/02* (2006.01)
(Continued)

(52) U.S. Cl.
CPC .......... *C01B 39/02* (2013.01); *B01J 13/0047* (2013.01); *B01J 20/08* (2013.01); *B01J 20/18* (2013.01);
(Continued)

(58) Field of Classification Search
CPC ..... C01B 33/1435; C01B 33/26; C01B 39/02; C01B 39/46; C01B 39/48; C01F 7/02;
(Continued)

(56) References Cited

U.S. PATENT DOCUMENTS 2,733,205 A * 1/1956 Dalton et al. ............. C01F 7/46
                                                       210/664
3,014,055 A   12/1961 Johnson et al.
(Continued)

FOREIGN PATENT DOCUMENTS

EP        1609759 A1    12/2005
WO     94/26663 A1    11/1994
(Continued)

OTHER PUBLICATIONS

Teagarden et al., "Conversion of aluminum chlorohydrate to aluminum hydroxide", Journal of the Society of Cosmetic Chemists, vol. 33, pp. 281-295, Sep./Oct. 1982.
(Continued)

*Primary Examiner* — David M Brunsman
(74) *Attorney, Agent, or Firm* — Kagan Binder, PLLC

(57) ABSTRACT

Disclosed are novel aqueous aluminum complex compositions and methods of making and using them. The novel compositions comprise very low halide content, even when made from aluminum chlorohydrate. The compositions find use in the production of zeolites, coatings, abrasives, binders, and refractories; and in the treatment of wastewater for example. The methods of making the novel compositions include passing a first aqueous aluminum complex composition through an anion exchange column or otherwise contacting the first composition with the anion exchange resin to provide a second aqueous aluminum complex composition that is different from the first aqueous aluminum complex composition. Also disclosed are methods of making zeolites and aqueous silica-alumina compositions from the novel aqueous aluminum complex compositions.

20 Claims, 10 Drawing Sheets

A schematic of a method of the First Embodiments

(51) Int. Cl.
*C01B 39/48* (2006.01)
*B01J 20/18* (2006.01)
*B01J 29/70* (2006.01)
*C01F 7/02* (2006.01)
*C01B 39/46* (2006.01)
*C01F 7/46* (2006.01)
*B01J 13/00* (2006.01)
*B01J 20/08* (2006.01)
*C01B 39/04* (2006.01)
*C01B 33/26* (2006.01)

(52) U.S. Cl.
CPC ....... *B01J 29/7015* (2013.01); *C01B 33/1435* (2013.01); *C01B 33/26* (2013.01); *C01B 39/04* (2013.01); *C01B 39/46* (2013.01); *C01B 39/48* (2013.01); *C01F 7/02* (2013.01); *C01F 7/46* (2013.01)

(58) Field of Classification Search
CPC .......... C01F 7/46; B01J 13/0047; B01J 20/08; B01J 20/18; B01J 29/7015
See application file for complete search history.

(56) References Cited

U.S. PATENT DOCUMENTS

| | | | |
|---|---|---|---|
| 3,252,917 | A | 5/1966 | Mindick et al. |
| 3,655,329 | A | 4/1972 | Shih et al. |
| 3,745,136 | A | 7/1973 | Moore, Jr. |
| 3,864,142 | A | 2/1975 | Kovarik |
| 3,957,598 | A | 5/1976 | Merkl |
| 4,327,032 | A | 4/1982 | Lohse et al. |
| 5,026,532 | A | 6/1991 | Gaffney et al. |
| 5,233,065 | A | 8/1993 | Sharif |
| 5,558,851 | A | 9/1996 | Miller |
| 5,863,516 | A | 1/1999 | Otterstedt et al. |
| 5,883,035 | A | 3/1999 | Yang |
| 6,022,471 | A | 2/2000 | Wachter et al. |
| 6,218,329 | B1 | 4/2001 | Singh et al. |
| 6,498,262 | B2 | 12/2002 | Jerome et al. |
| 6,585,952 | B1 | 7/2003 | Pinnavaia et al. |
| RE40,299 | E | 5/2008 | Bruinsma et al. |
| 8,106,229 | B2 | 1/2012 | Holland et al. |
| 8,658,127 | B2 | 2/2014 | Holland |
| 8,845,991 | B2 | 9/2014 | Keiser et al. |
| 9,108,190 | B1 | 8/2015 | Fan et al. |
| 2003/0091872 | A1 | 5/2003 | Yan |
| 2005/0234136 | A1 | 10/2005 | Holland et al. |
| 2006/0140854 | A1 | 6/2006 | Juttu et al. |
| 2007/0104643 | A1 | 5/2007 | Holland |
| 2007/0231249 | A1 | 10/2007 | Batllo et al. |
| 2007/0260062 | A1* | 11/2007 | Goetz ................ C07D 487/04 544/338 |
| 2008/0118431 | A1 | 5/2008 | Vermeiren et al. |
| 2008/0293987 | A1 | 11/2008 | Khanmamedova et al. |
| 2011/0054232 | A1 | 3/2011 | Sangar et al. |
| 2012/0004486 | A1 | 1/2012 | Lewis et al. |
| 2012/0123138 | A1 | 5/2012 | Ganhy et al. |
| 2013/0052125 | A1 | 2/2013 | Moini et al. |
| 2014/0147378 | A1 | 5/2014 | Davis et al. |
| 2014/0241981 | A1 | 8/2014 | Dutta et al. |
| 2014/0263170 | A1 | 9/2014 | Long et al. |
| 2015/0190792 | A1 | 7/2015 | Muraza et al. |
| 2015/0218007 | A1 | 8/2015 | Chen et al. |
| 2015/0343375 | A1 | 12/2015 | Moini et al. |
| 2015/0360964 | A1 | 12/2015 | Rimer et al. |
| 2016/0101415 | A1 | 4/2016 | Ji et al. |

FOREIGN PATENT DOCUMENTS

| | | |
|---|---|---|
| WO | 2006103092 A1 | 10/2006 |
| WO | 2008/060768 A2 | 5/2008 |
| WO | 2015/042094 A1 | 3/2015 |

OTHER PUBLICATIONS

International Search Report dated Jan. 26, 2017 for International application No. PCT/US2016/058839, 6 pages.
Written Opinion dated Jan. 26, 2017 for International application No. PCT/US2016/058839, 6 pages.
Robin Harris et al., "NMR Nomenclature. Nuclear Spin Properties and Conventions for Chemical Shifts," Pure Applied Chemistry, vol. 73, No. 11, pp. 1795-1818 (2001).
Ralph K. Iller, "The Chemistry of Silica: Solubility, Polymerization, Colloid and Surface Properties and Biochemistry of Silica," John Wiley and Sons, Inc., pp. 312-599 (1979).
Ramanath N. Bhat, et al. "Synthesis of Zeolite Beta Using Silica Gel as a Source of SiO2" Journal of Chem. Tech. and Biotech, vol. 48, pp. 453-466 (1990).
Cundy et al. "The hydrothermal synthesis of zeolite: Precursors, intermediates and reaction mechanism", Microporous and Mesoporous Materials, vol. 82, Issues 1-2, pp. 1-78 (2005).
Bi et al, "Studies on the mechanism of hydrolysis and polymerization of aluminum salts in aqueous solution: correlations between the "Core-links" model and "Cage-like" Keggin Al(subscript 13) model", Coordination Chemistry Reviews, vol. 248, Issues 5-6, pp. 441-445, (2004).
Mintova et al., "Formation of colloidal molecular sieves: influences of silica precursor," Colloids and Surfaces A: Physicochem. Eng. Aspects vol. 207, pp. 153-157, (2003).
Mohamed et al., "Effects of the silica sources on the crystallinity of nanosized ZSM-5 zeolite," Microporous and Mesoporous Materials, vol. 79, pp. 7-12, (2005).
International Search Report for International Application No. PCT/US2017/063965, dated Feb. 6, 2018, 6 pages.
Written Opinion for International Application No. PCT/US2017/063965, dated Feb. 6, 2018, 10 pages.
Alipour et al., "Effects of the different synthetic parameters on the crystallinity and crystal size of nanosized ZSM-5 zeolite", Rev. Chem. Eng., 2014, 30 (3), pp. 289-322.
Robson, ed., "Verified Synthesis of Zeolitic Materials", Second Revised Edition, Elsevier, 2001, 177 pages.

* cited by examiner

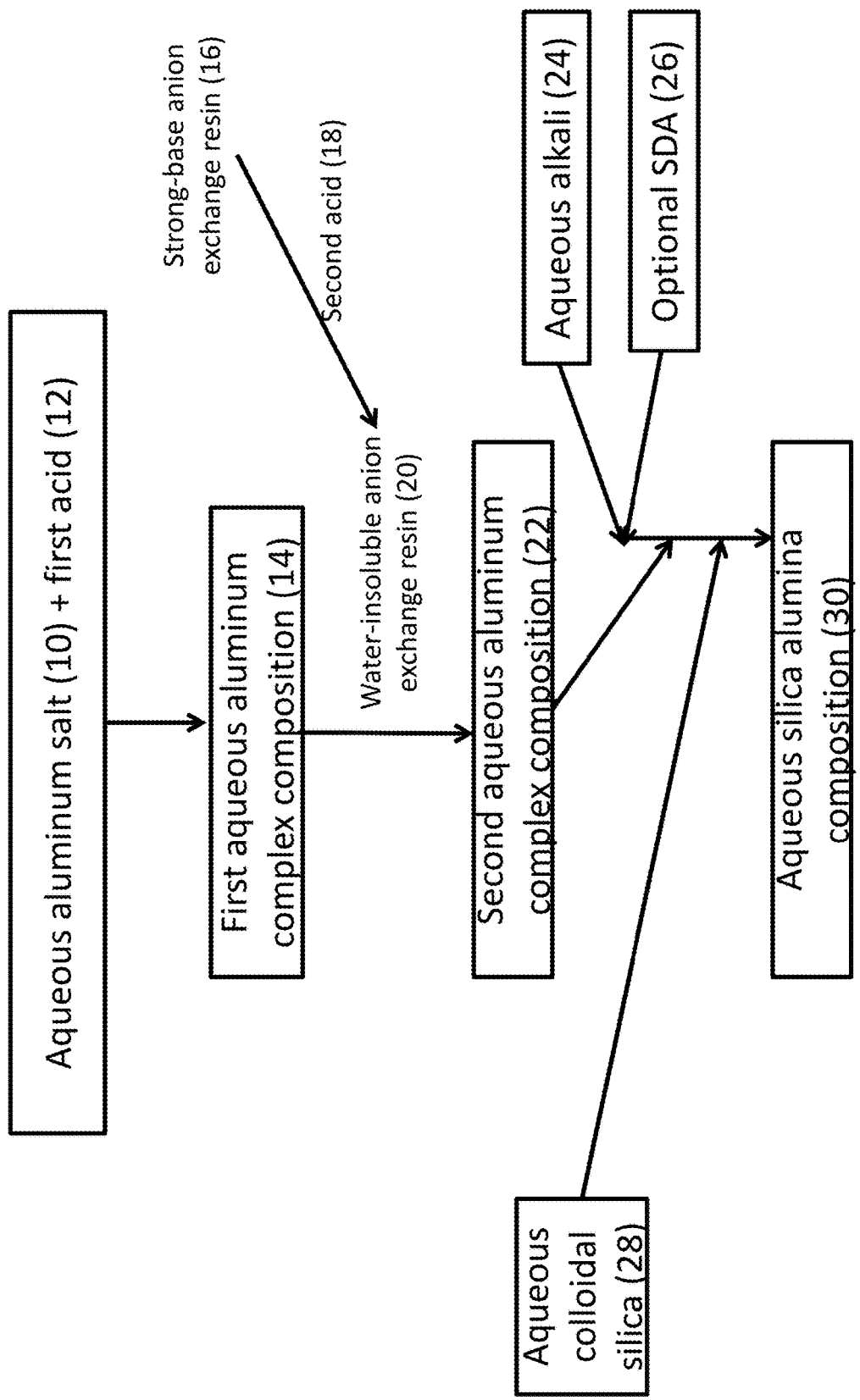
Figure 1: A schematic of a method of the First Embodiments

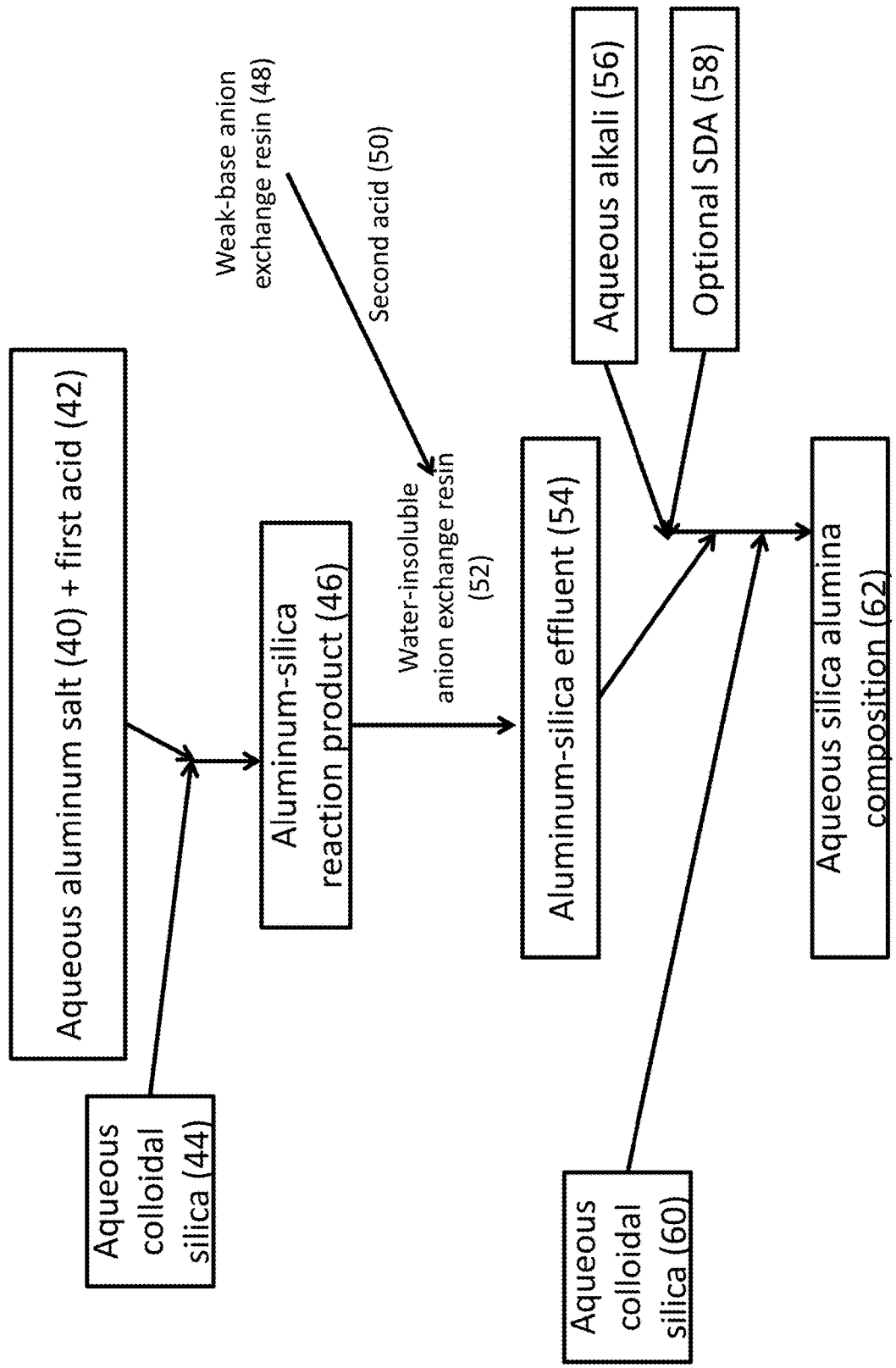
Figure 2: A schematic of a method of the Second Embodiments

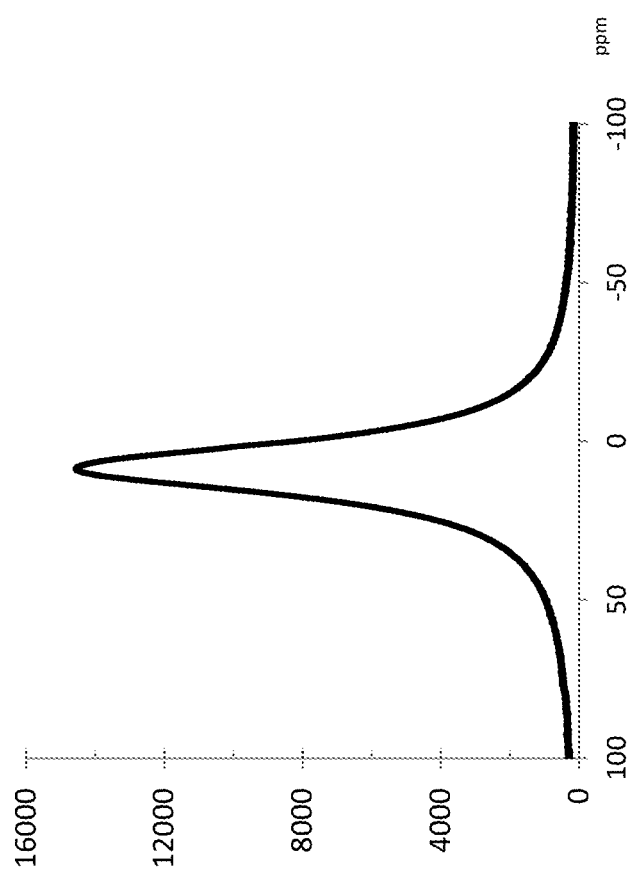
Figure 3: $^{27}$Al NMR spectrum of an aqueous commercial dibasic aluminum acetate

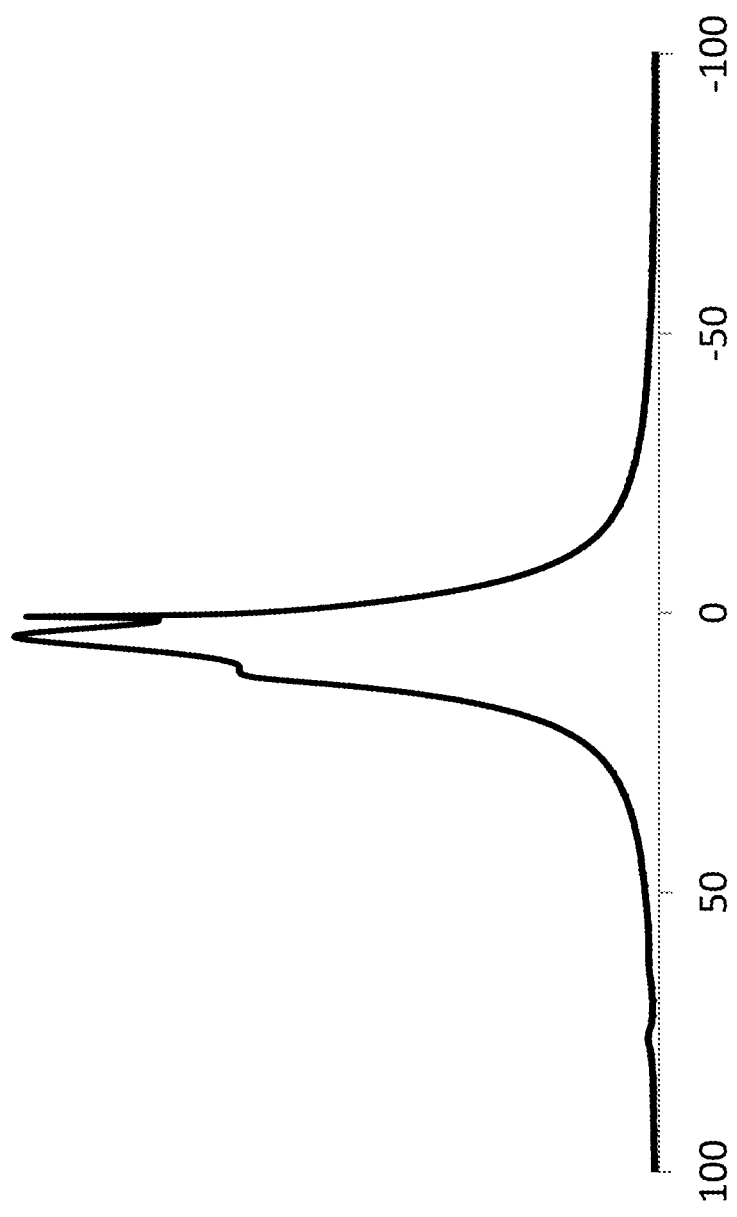
Figure 4: $^{27}$Al NMR spectrum of the starting mixture of Example 2

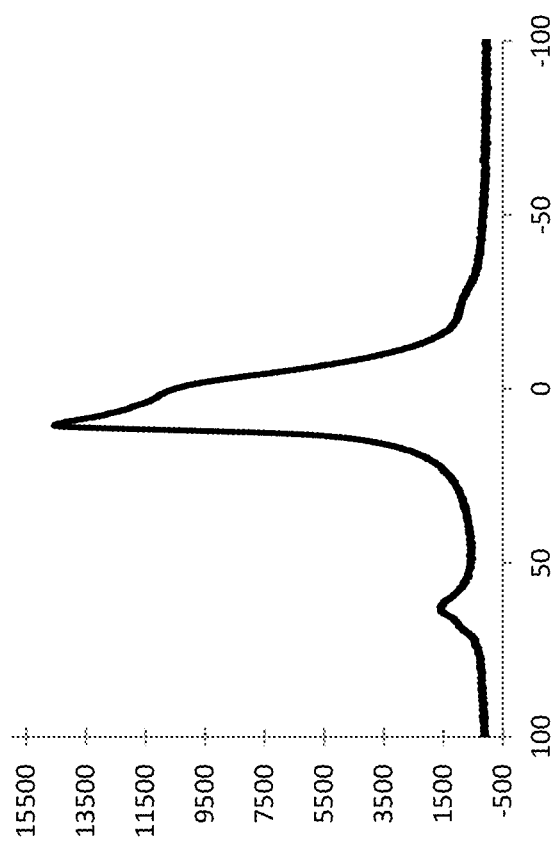
Figure 5: $^{27}$Al NMR spectrum of the final product of Example 2

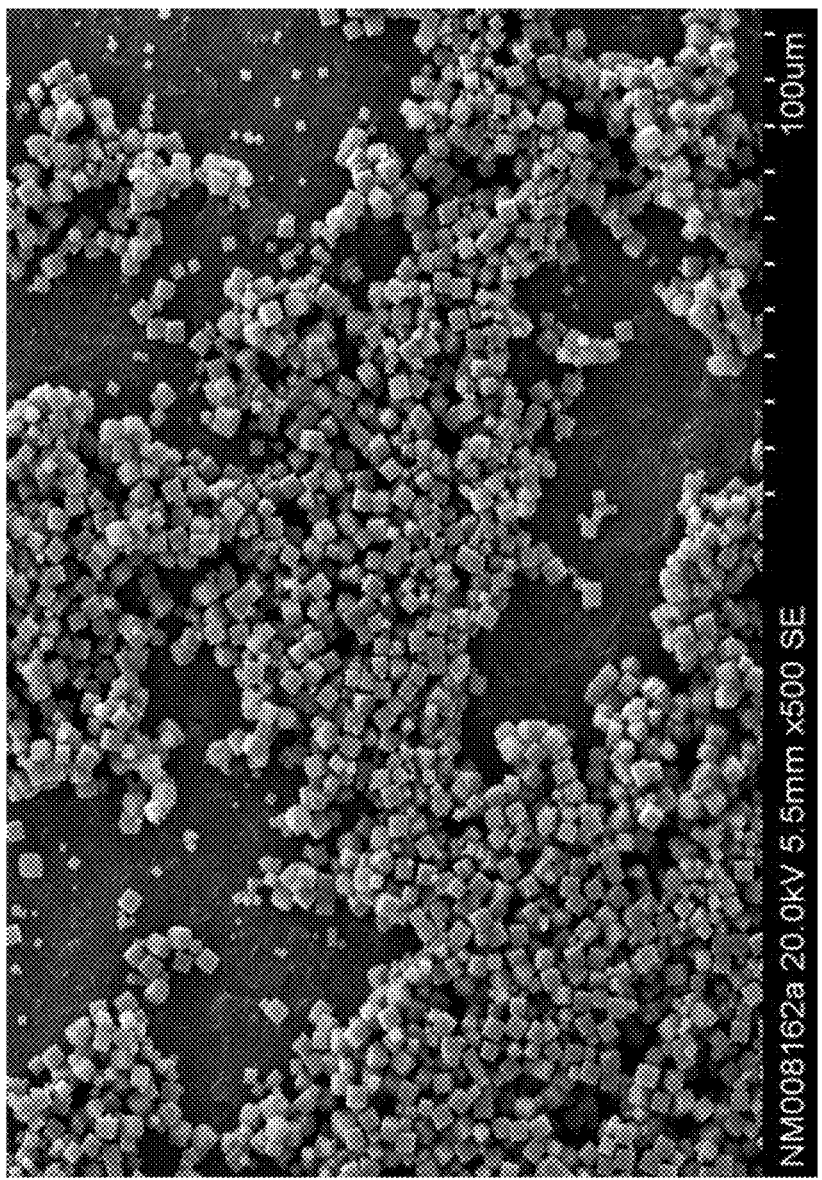
Figure 6: Scanning electron micrograph of the zeolite product of Example 4

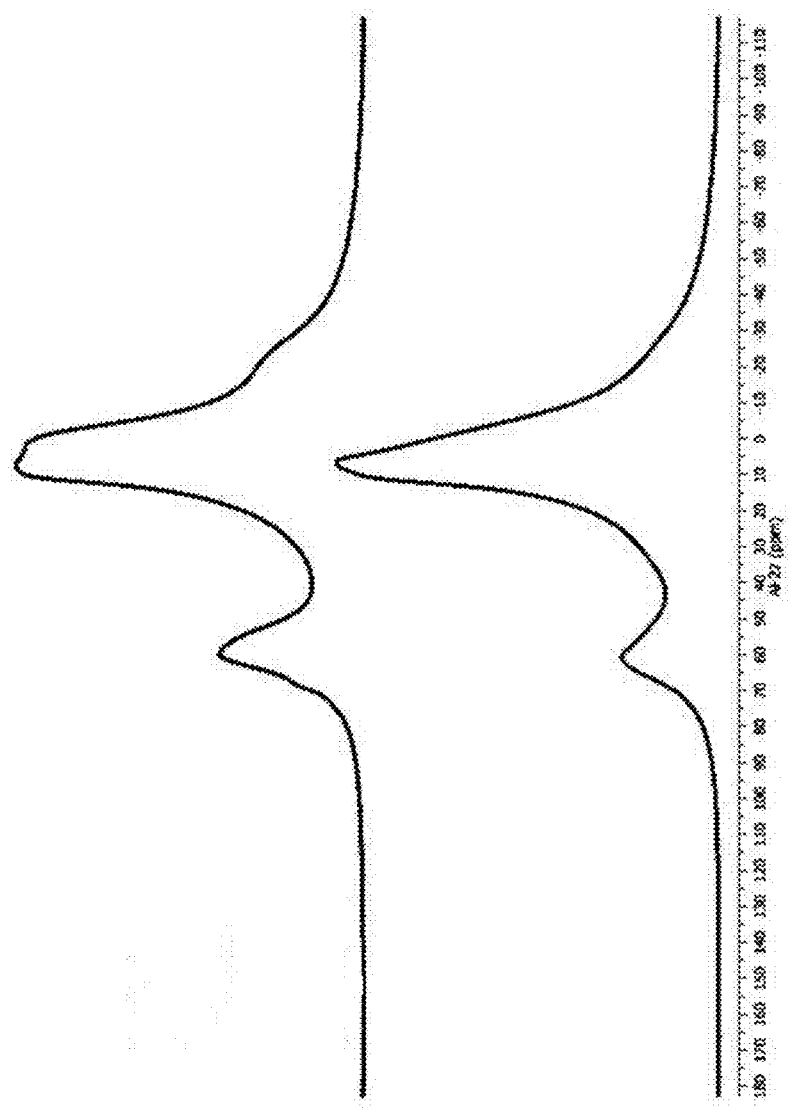
Figure 7: $^{27}$Al NMR spectrum of aluminum composite sol from Example 8

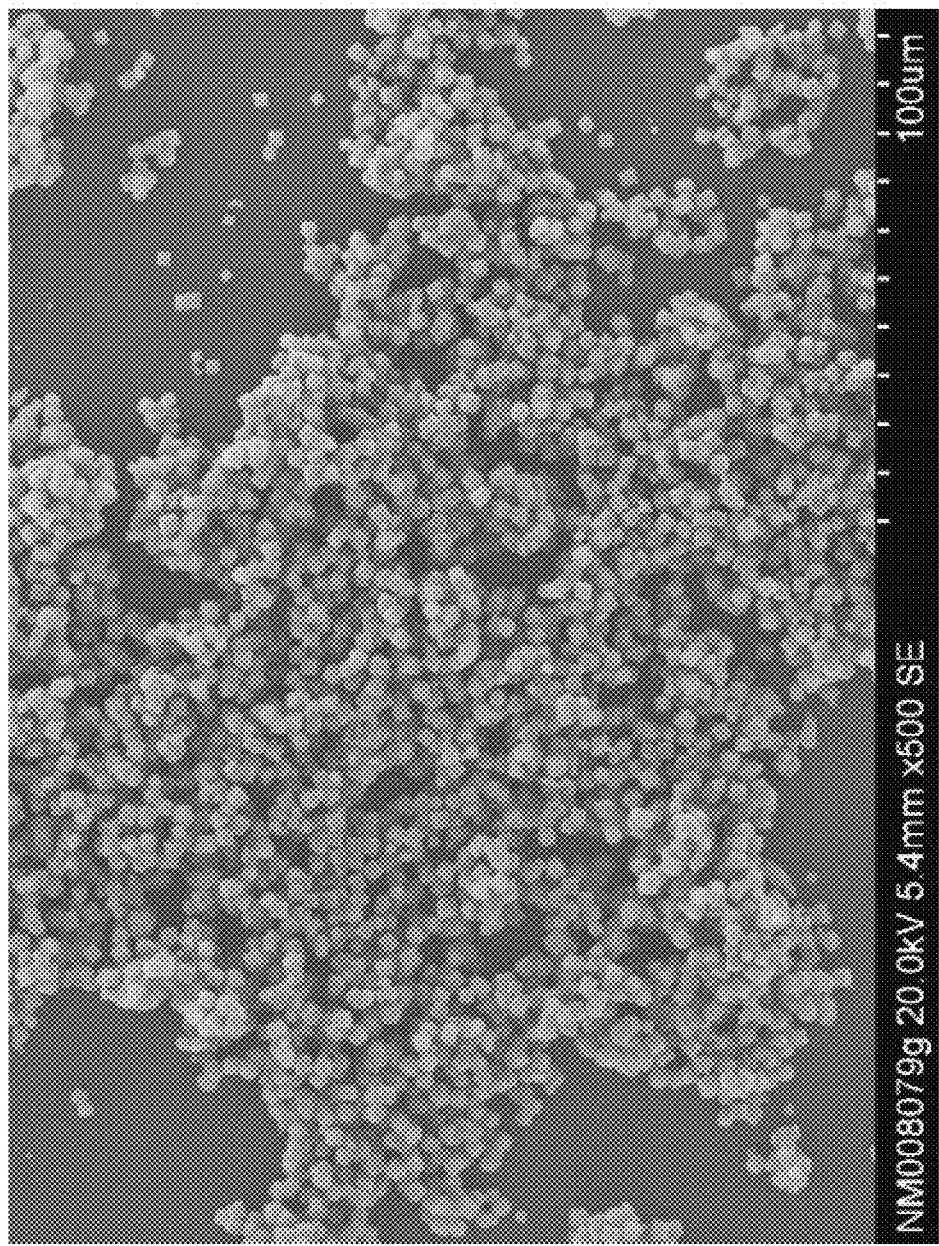
Figure 8: Scanning electron micrograph of zeolite product of Example 9

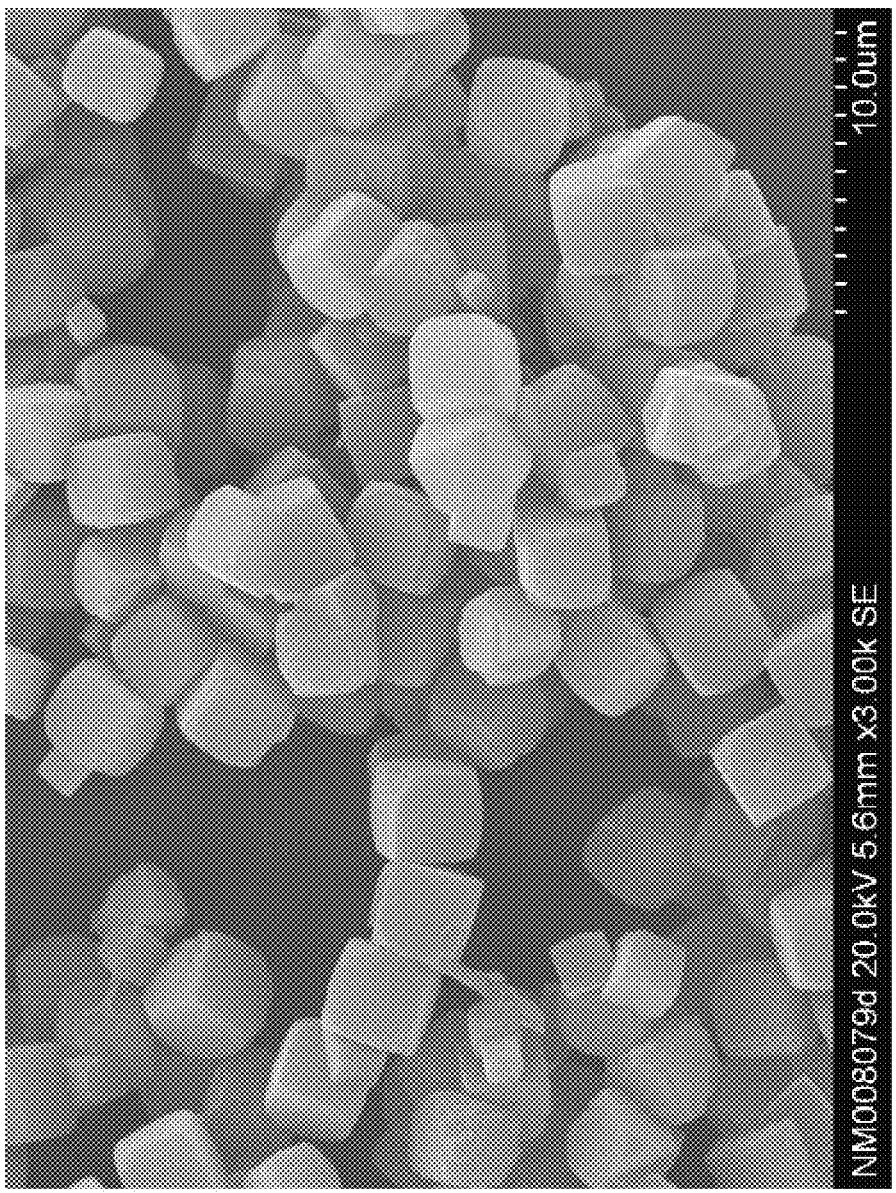
Figure 9: Scanning electron micrograph of zeolite product of Example 9

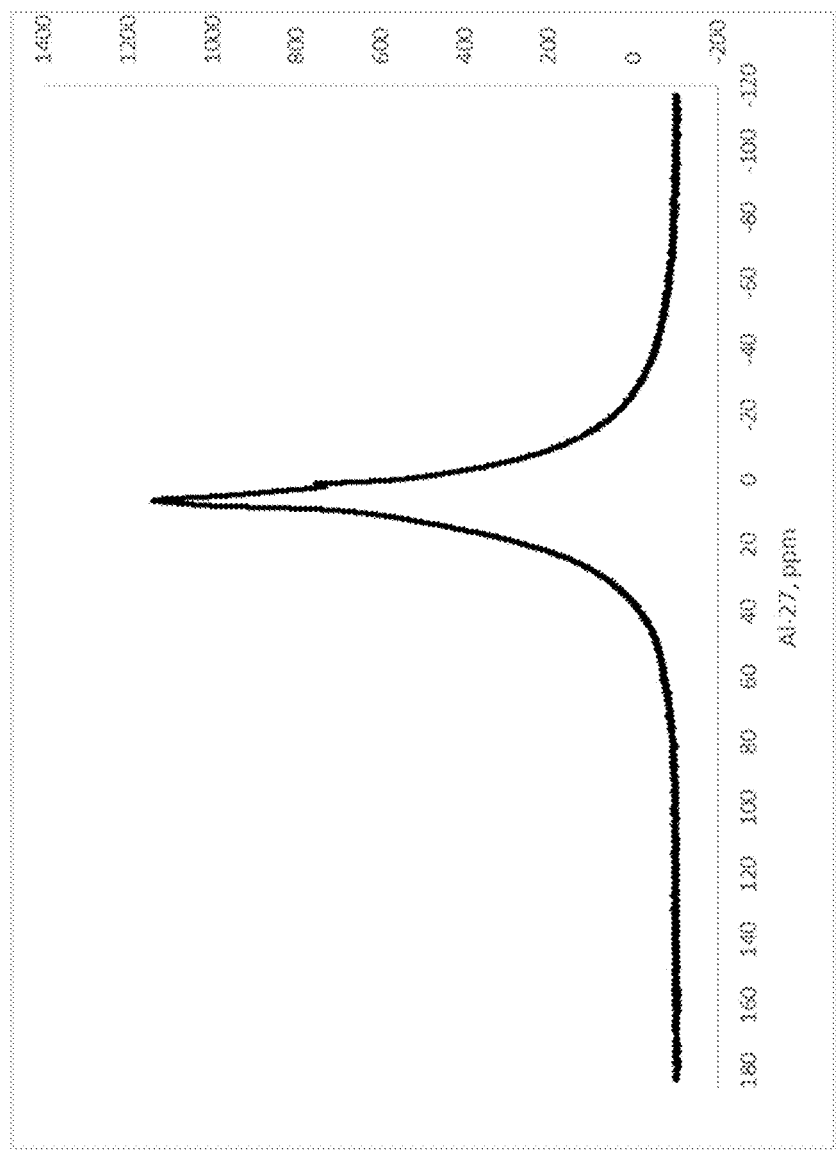
Figure 10: $^{27}$Al NMR spectrum of aqueous solution of a commercial dibasic aluminum acetate combined with an aqueous colloidal silica of Example 10

POLYALUMINUM SALTS AND THEIR USES IN PREPARATION OF HIGH-PURITY COLLOIDAL ALUMINUM-SILICA COMPOSITE PARTICLES AND ZEOLITES

SUMMARY

The present invention relates to novel aqueous polyaluminum complexes made by contacting an acidic solution of an aluminum salt such as aluminum chlorohydrate with an anion exchange resin such as an weak-base or strong-base anion exchange resin preconditioned with a non-mineral acid. The invention further relates to the use of aqueous polyaluminum complexes in synthesizing aluminum-silica composite particles, and to zeolites made therefrom. The invention also relates to a process of making the aqueous polyaluminum complexes by treating aqueous aluminum ion solutions with anion exchange resin to provide the aqueous polyaluminum complexes of the invention.

BACKGROUND OF THE INVENTION

Aqueous aluminum salts are typically acidic and can form complex cations, anions, and molecules whose structure is dependent on pH, for example cations such as $[Al_{13}O_4(OH)_{24}(H_2O)_{12}]^{7+}$. Polyaluminum salts find application as flocculants and in water treatment and purification. Such aluminum compounds tend to contain group V, VI, and VII elements, as well as metals as contaminants. Halogen content such as chloride, for example, can limit the use of such compounds in applications where such content is undesirable. For example, if the aluminum compound is a component of a product that is subsequently subject at any point its life cycle to heating and/or combustion (e.g. incineration of the product after disposal), toxic gaseous byproducts containing chlorine may evolve. Therefore there is a need to prepare polyaluminum salts free of the presence of undesirable contaminating amounts of group V, VI, VII and other elements. Furthermore, there is a need to prepare aluminum compounds and compositions including aqueous aluminum compositions of high purity for applications that are impurity sensitive, for example if the aluminum compounds are used as or used in the synthesis of catalysts. One particular class of catalysts is zeolites.

Zeolites are microporous, metalosilicate composites or minerals, typically aluminosilicate composites are commonly used as commercial adsorbents and catalysts. While zeolites occur naturally, they are also produced industrially on a large scale. Zeolites are characterized as microporous because their constituent silicon, oxygen, and metal/aluminum atoms are arranged into various ring configurations which are positioned in a series such that the series of rings define channels passing through the mineral. The specific number and ratio of types of atoms in any given ring determines the width of the channels. As a result, different numbered rings can result in channel width which varies in order to accommodate only one or some of specific ions/cations such as $Na^+$, $K^+$, $Ca^{2+}$, $Mg^{2+}$, or others.

Because of their unique structure and their ion-specific affinity, zeolites possess a number of properties that are desirable for a wide range of industrial and commercial uses. As a result of these properties zeolites are often used as and referred to as molecular sieves. Uses include, but are not limited to, ion-exchange, water purification, water softening, catalysts, sorbents, gas separation, oxygen generation, petrochemical catalysts, Lewis acid catalysts, catalytic cracking catalysts, nuclear-radioactive materials, hygroscopic heat absorbers, detergents, asphalt-concrete substrates, gemstones, blood clotting agents, potassium releasing fertilizers, agricultural water releasing agents, and aquarium filters.

SUMMARY OF THE DISCLOSURE

The aqueous polyaluminum complexes of the invention comprise one or more aluminum complexes and/or compounds having aluminum advantageously and unexpectedly situated in octahedral and tetrahedral coordination environments. The complexes can be used in a variety of applications, such as in wastewater treatment and in the production of coatings, abrasives, binders, refractories, colloids, and zeolites.

In some of these applications, the aluminum complex is subject to high temperatures. For example, the synthesis of the zeolites involves a calcination step, in which the zeolite is heated at a high temperature. The complexes of the invention advantageously comprise very low amounts of group V, VI, and VII elements and metals other than aluminum. The presence of group V, VI, VII elements and/or various metals other than aluminum in known aluminum complexes is disadvantageous, because in some uses of the aluminum complexes or in the lifecycle thereof, the aluminum complex or products derived therefrom can be heated at a high temperature or be subject to combustion. From such heating or combustion, toxic vapors, gases, and/or aerosols can result from the presence of group V, VI, and VII elements. The complex compounds of the invention have a very low content of halides such as chloride. In embodiments, the complex compounds advantageously have combustible counterion content associated therewith such as organic anion. Examples of such organic anion include carboxylates including alpha-carboxylates such as acetate.

Further, the aqueous complex compounds having associated therewith anions that are the conjugate bases of weak acids can be used to produce alumina-silica sols that produce zeolites with high levels of crystallinity and/or phase purity. In this context, weak acids means acids having a pKa of about 3 to about 13, in embodiments about 3 to about 10, in embodiments about 3.5 to about 9.5, in embodiments about 3 to about 5, or in embodiments about 3.5 to about 5. The complexes having anions of conjugate bases of weak acids associated therewith require less aqueous alkali and/or base to neutralize them to produce a sol useful in the synthesis of zeolites. Such sols contain less salt resulting from the neutralization of the complex. Irrespective of the reason, such sols on exposure to heat and/or pressure produce zeolites with extremely high morphological purity.

The disclosed process of making the aqueous polyaluminum complexes is more efficient than those known in the art in which multiple steps are required in order to provide the complex—for example processes in which an aluminum salt is dissolved at high temperature, precipitated, washed, and/or redissolved at low pH.

The polyaluminum complexes of the invention can be used to form aluminosilicate sols useful in the synthesis of zeolites. Because zeolites have a broad range of applications, it is desirable to develop stable, effective and user friendly alumina and silica composite sols with high purity and high solid concentration through economical processes. The disclosed composite aluminum-silica sols exhibit high purity, high activity, high solids concentration, are non-flammable, and provide for homogeneous mixing of silica and alumina. The disclosed sols produce zeolite materials with high morphological purity and/or high crystallinity.

Zeolites are microporous, metalosilicate composites or minerals, typically aluminosilicate composites are commonly used as commercial adsorbents and catalysts. While zeolites occur naturally, they are also produced industrially on a large scale. Zeolites are characterized as microporous because their constituent silicon, oxygen, and metal/aluminum atoms are arranged into various ring configurations which are positioned in a series such that the series of rings define channels passing through the mineral. The specific number and ratio of types of atoms in any given ring determines the width of the channels. As a result, different numbered rings can result in channel width which varies in order to accommodate only one or some of specific ions/cations such as $Na^+$, $K^+$, $Ca^{2+}$, $Mg^{2+}$, or others.

Because of their unique structure and their ion-specific affinity, zeolites possess a number of properties that are desirable for a wide range of industrial and commercial uses. As a result of these properties zeolites are often used as and referred to as molecular sieves. Uses include, but are not limited to, ion-exchange, water purification, water softening, catalysts, sorbents, gas separation, oxygen generation, petrochemical catalysts, Lewis acid catalysts, catalytic cracking catalysts, nuclear-radioactive materials, hygroscopic heat absorbers, detergents, asphalt-concrete substrates, gemstones, blood clotting agents, potassium releasing fertilizers, agricultural water releasing agents, and aquarium filters.

At least two types of aqueous aluminum complex compositions are disclosed herein, based on their methods of synthesis and the order of steps therein. The two types of aluminum complex compositions are herein referred to as "alumina-silica effluent" and "second aqueous aluminum complex composition". Each of the alumina-silica effluent or the second aqueous aluminum complex composition is combined with an aqueous alkali, optionally a structure directing agent, and colloidal silica sol to provide an aqueous silica-alumina composition. The aqueous silica-alumina composition, irrespective of whether it is made from an alumina-silica effluent or from a second aqueous complex composition, can be subjected to heat and elevated pressure to produce a zeolite. Calcination of such a zeolite can produce calcined zeolites of high crystallinity and/or high morphological purity. Two schemas are depicted in FIG. 1 (a First Embodiments of the invention) and FIG. 2 (a Second Embodiment of the invention), described in detail below.

Because zeolites have a broad range of applications, it is desirable to develop stable, effective and user friendly alumina and silica composite sols with high purity and high solid concentration through economical processes. The disclosed composite aluminum-silica sols exhibit high purity, high activity, high solids concentration, are non-flammable, and provide for homogeneous mixing silica and alumina.

This disclosure provides a process of preparing homogeneous aluminum-silica composite colloids.

In certain embodiments, the composite aluminum-silica sols consist of colloidal silica, aluminum and combustible stabilizers.

In some embodiments, the pH of the aqueous colloidal silica is in a range of about 9-11. In other embodiments, the colloidal silica comprises particles having a size of about 9 to 60 nm.

In embodiments, the water-insoluble anion exchange resin is obtained by preconditioning a basic anion exchange resin (also water-insoluble) with an aqueous acetic or another non-mineral acid solution. In embodiments, the non-mineral acid solution has a pKa of about 3.5 to about 9.5. In some embodiments, the basic anion exchange resin is a weak-base anion exchange resin, in other embodiments the basic anion exchange resin is a strong-base anion exchange resin, in still other embodiments, the basic anion exchange resin is a combination of a weak-base anion exchange resin and a strong-base anion exchange resin. In embodiments the anion exchange resin has a total capacity in a range of about 0.15 to 3.5 eq/L or greater, preferably a total capacity in a range of about 1 to 2.5 eq/L. Suitable weak-base anion exchange resins in free base form include conventional weak-base resin having functional groups composed of secondary and tertiary amines and complex amines, or mixtures of these functional groups.

In some embodiments the ratio of aluminum to silica in the homogeneous aluminum-silica composite colloid is in a range of about 10 to 50, preferably in a range of about 10-30.

This disclosure also provides a homogeneous aluminum-silica composite consists essentially of tetrahedral and octahedral aluminum coordination environments.

This disclosure process provides a homogeneous aluminum-silica composite having a purity of less than about 200 ppm chloride ions and less than about 1 ppm sodium ions.

In still other embodiments, the process further comprises forming different types of zeolite from the homogeneous aluminum-silica composite colloid including but not limited, Beta, Chabazite, ZSM series, Mordenite, SAPO series, an abrasive, a retaining agent, an absorbent, a binder, a filler, or a coating component.

This disclosure provides composite aluminum-silica sols having unique chemical composition and structural features that enable a stable liquid suspension. The composite aluminum-silica sols also possess high purity by eliminating non-combustible metal elements other than Si and Al, such as group VI and VII elements, in the production process. In certain embodiments, the aluminum in the composite aluminum-silica sols is present in a mixture of tetrahedral and octahedral coordination environment.

This disclosure provides for using a fixed bed process in which an aluminum salt solution is blended with stabilizers and in some embodiments blended with colloidal silica (in its acid form or its original basic form), then passed through an anion exchange resin column to provide a effluent liquid product. In this process, typical stabilizers include, but not limited to, agents that form complex ions with aluminum cations, such as lactic acid and other alpha hydroxyl carboxylic acids. This fixed bed process is more convenient than previously reported processes that disclose contacting a starting mixture with resin in a fixed ratio and subsequently recovering a liquid product by separation of the resin.

This disclosure also allows the use of cost-effective basic colloidal silica (typically in a pH range of about 9-11) as the starting material to make the composite aluminum-silica sols as compared to the previously reported process that requires the use of acidic colloidal silica (typically in a pH range of about 2-6) as starting material. This acidic colloidal silica is typically made by deionizing the basic colloidal silica in a costly process.

The disclosure provides a homogenous, stable composite aluminum-silica sols consisting of aluminum and colloidal silica with solid concentration of 35 wt % or greater and with high purity.

The disclosed composite aluminum-silica sols are unique as precursors for the synthesis of zeolite, abrasives for polishing, fillers for coating, binders for refractories or inorganic supports.

Summary of First Embodiments

In embodiments, there is provided a method comprising combining a water-soluble aluminum salt and a first acid having a pKa of about 3.0 to about 9.5 in an aqueous blend to form a first aqueous aluminum complex composition, and contacting the first aqueous aluminum complex composition with a water-insoluble anion exchange resin to provide a second aqueous aluminum complex composition. In embodiments, the contacting the first aqueous aluminum complex composition with the water-insoluble anion exchange resin comprises or consists of passing the first aqueous complex composition through a fixed bed of the water-insoluble anion exchange resin. In embodiments, the fixed bed comprises a columnar containment and the water-insoluble exchange resin disposed therein. In embodiments, the second aqueous aluminum complex composition comprises less than about 200 ppm by weight of halide ions, in embodiments about 10 ppm to about 150 ppm. In embodiments, the water-soluble aluminum salt comprises, consists of, or consists essentially of aluminum chlorohydrate. In embodiments, the first acid has a pKa of about 3.0 to about 9.5, in embodiments about 3.5 to about 9.5, in embodiments about 3.0 to about 5.5, in embodiments about 3.5 to about 5.5, in embodiments about 3.0 to about 5.0, or in embodiments about 3.5 to about 5.0. In embodiments, the first acid comprises, consists of, or consists essentially of a carboxylic acid having a pKa of about 4.5 to about 5.5. In embodiments, the carboxylic acid has a water-solubility at 20° C. of at least 4.5 g/100 mL. In embodiments, the first acid comprises, consists of, or consists essentially of an alpha-carboxylic acid. In embodiments, the first acid is an alpha-hydroxy carboxylic acid having a pKa from about 3.0 to about 4.0, in embodiments about 3.5 to about 4.0. In embodiments, the alpha-hydroxy carboxylic acid comprises, consists of, or consists essentially of glycolic acid, lactic acid, malic acid, citric acid, or any combination thereof. In embodiments, the first acid is selected from the group consisting of lactic acid, boric acid, acetic acid, and any combination thereof. In embodiments, the first acid comprises, consists of, or consist essentially of acetic acid.

In embodiments, the method further comprises preconditioning a basic anion exchange resin (water-insoluble) with a second acid having a pKa of 3.0 to 9.5 to provide the water-insoluble anion exchange resin. In embodiments, the preconditioning comprises or consists of contacting the basic anion exchange resin with the second acid. In embodiments, the preconditioning comprises or consists of passing the second acid through a fixed bed of the basic anion exchange resin to provide the water-insoluble anion exchange resin. In embodiments, the second acid has a pKa of about 3.0 to about 9.5, in embodiments about 3.5 to about 9.5, in embodiments about 3.0 to about 5.5, in embodiments about 3.5 to about 5.5, in embodiments about 3.0 to about 5.0, or in embodiments about 3.5 to about 5.0. In embodiments, the second acid comprises, consists of, or consists essentially of a carboxylic acid having a pKa of about 4.5 to about 5.5. In embodiments, the carboxylic acid has a water-solubility at 20° C. of at least 4.5 g/100 mL. In embodiments, the second acid comprises, consists of, or consists essentially of an alpha-carboxylic acid. In embodiments, the second acid is an alpha-hydroxy carboxylic acid having a pKa from about 3.0 to about 4.0, in embodiments about 3.5 to about 4.0. In embodiments, the alpha-hydroxy carboxylic acid comprises, consists of, or consists essentially of glycolic acid, lactic acid, malic acid, citric acid, or any combination thereof. In embodiments, the second acid is selected from the group consisting of lactic acid, boric acid, acetic acid, and any combination thereof. In embodiments, the second acid comprises, consists of, or consist essentially of acetic acid.

In some embodiments, the basic anion exchange resin is a weak-base anion exchange resin, in other embodiments the basic anion exchange resin is a strong-base anion exchange resin, in still other embodiments, the basic anion exchange resin is a combination of a weak-base anion exchange resin and a strong-base anion exchange resin. In embodiments, the basic anion exchange resin comprises, consists of, or consists essentially of a strong-base anion exchange resin.

In embodiments, the method further comprises combining an aqueous alkali, the second aqueous aluminum complex composition, and an aqueous colloidal silica to provide an aqueous silica-alumina composition. In embodiments, the silica in the aqueous silica-alumina composition has a particle size of 3 nm to 150 nm. In some such embodiments, the method comprises combining the aqueous alkali, the second aqueous aluminum complex composition, the aqueous silica, and one or more structure directing agents. In embodiments, the water-soluble aluminum salt comprises, consists of, or consists essentially of aluminum chlorohydrate. In embodiments, the aqueous alkali comprises, consists of, or consists essentially of aqueous sodium hydroxide, aqueous potassium hydroxide, or a mixture thereof. In embodiments, the aqueous colloidal silica has a pH in the range from 1-11, a particle size of from about 3-150 nm, and/or a silica concentration of from about 15%-50% by weight. In embodiments, the first acid comprises, consists of, or consists essentially of acetic acid. In embodiments, the second acid comprises or consists essentially of acetic acid. In embodiments, the one or more structure directing agents is selected from the group consisting of N,N,N-trimethyl-1-adamantylammonium hydroxide, tetramethylammonium hydroxide, tetrapropylammonium hydroxide, tetraethylammonium hydroxide, tetrabutylammonium hydroxide, tetrahexylammonium hydroxide, tetraoctylammonium hydroxide, methyltributylammonium hydroxide, methyltriethylammonium hydroxide, phenyltrimethylammonium hydroxide, methyltripropylammonium hydroxide, dodecyltrimethylammonium hydroxide, hexadecyltrimethylammonium hydroxide, N-dodecyl N-ethyl N,N-dimethyl ammonium hydroxide, N,N-dimethyl N,N-diethyl ammonium hydroxide, and any combination thereof. In embodiments, the one or more structure directing agents comprises, consists of, or consists essentially of N,N,N-trimethyl-1-adamantylammonium hydroxide.

In embodiments, the method of the first embodiments further comprises: heating the aqueous silica-alumina composition under autogenous pressure at a temperature of between about 100° C. to about 250° C. for about 12 hours to about 24 hours to provide an aqueous zeolite composition comprising an uncalcined zeolite product. In embodiments, the method further comprises separating the uncalcined zeolite product from the aqueous zeolite composition. In some such embodiments, the separating comprises or consists of filtering the uncalcined zeolite product from the aqueous zeolite composition. In embodiments, the method further comprises washing the uncalcined zeolite product with an aqueous wash. In embodiments, the method further comprises heating the uncalcined zeolite product for 1 hour to 12 hours at 400° C. to 1000° C. to provide a calcined zeolite. In some embodiments, the structure direct agent consists of or consists essentially of N,N,N-trimethyl-1-adamantylammonium hydroxide and the calcined zeolite is a chabazite.

In embodiments, there is provided a composition comprising, consisting of, or consisting essentially of the second aqueous aluminum complex composition of any of the methods disclosed herein.

In embodiments, there is provided a composition comprising, consisting of, or consisting essentially of the aqueous silica-alumina composition of any of the methods disclosed herein.

In embodiments, there is provided a composition comprising, consisting of, or consisting essentially of the aqueous zeolite composition of any of the methods described herein.

In embodiments, there is provided a composition comprising, consisting of, or consisting essentially of the uncalcined zeolite product of any of the methods disclosed herein.

In embodiments, there is provided the calcined zeolite of any of the methods disclosed herein.

Summary of Second Embodiments

In second embodiments, there is provided a method comprising combining a water-soluble aluminum salt, a first acid having a pKa of about 3.0 to about 9.5, and an aqueous colloidal silica in an aqueous blend to form an aluminum-silica reaction product; and passing the aluminum-silica reaction product through a fixed bed of a water-insoluble anion exchange resin to provide an aluminum-silica effluent. In embodiments, the fixed bed comprises a columnar containment and the water-insoluble exchange resin disposed therein. In embodiments, aluminum-silica effluent comprises less than about 200 ppm by weight of halide ions, in embodiments about 10 ppm to about 150 ppm. In embodiments, the water-soluble aluminum salt comprises, consists of, or consists essentially of aluminum chlorohydrate. In embodiments, the first acid has a pKa of about 3.0 to about 9.5, in embodiments about 3.5 to about 9.5, in embodiments about 3.0 to about 5.5, in embodiments about 3.5 to about 5.5, in embodiments about 3.0 to about 5.0, or in embodiments about 3.5 to about 5.0. In embodiments, the first acid comprises, consists of, or consists essentially of a carboxylic acid having a pKa of about 4.5 to about 5.5. In embodiments, the first acid comprises, consists of, or consists essentially of an alpha-carboxylic acid. In embodiments, the first acid is an alpha-hydroxy carboxylic acid having a pKa from about 3.0 to about 4.0, in embodiments about 3.5 to about 4.0. In embodiments, the alpha-hydroxy carboxylic acid comprises, consists of, or consists essentially of glycolic acid, lactic acid, malic acid, citric acid, or any combination thereof. In embodiments, the first acid is selected from the group consisting of lactic acid, boric acid, acetic acid, and any combination thereof. In embodiments, the first acid comprises, consists of, or consist essentially of acetic acid.

In embodiments, the method further comprises preconditioning a basic anion exchange resin with a second acid having a pKa of 3.0 to 9.5 to provide the water-insoluble anion exchange resin. In embodiments, the preconditioning comprises or consists of contacting the basic anion exchange resin with the second acid. In embodiments, the preconditioning comprises or consists of passing the second acid through a fixed bed of the basic anion exchange resin to provide the water-insoluble anion exchange resin. In embodiments, the second acid has a pKa of about 3.0 to about 9.5, in embodiments about 3.5 to about 9.5, in embodiments about 3.0 to about 5.5, in embodiments about 3.5 to about 5.5, in embodiments about 3.0 to about 5.0, or in embodiments about 3.5 to about 5.0. In embodiments, the second acid comprises, consists of, or consists essentially of a carboxylic acid having a pKa of about 4.5 to about 5.5. In embodiments, the second acid comprises, consists of, or consists essentially of an alpha-carboxylic acid. In embodiments, the second acid is an alpha-hydroxy carboxylic acid having a pKa from about 3.0 to about 4.0, in embodiments about 3.5 to about 4.0. In embodiments, the alpha-hydroxy carboxylic acid comprises, consists of, or consists essentially of glycolic acid, lactic acid, malic acid, citric acid, or any combination thereof. In embodiments, the second acid is selected from the group consisting of lactic acid, boric acid, acetic acid, and any combination thereof. In embodiments, the second acid comprises, consists of, or consist essentially of acetic acid.

In some embodiments, the basic anion exchange resin is a weak-base anion exchange resin, in other embodiments the basic anion exchange resin is a strong-base anion exchange resin, in still other embodiments, the basic anion exchange resin is a combination of a weak-base anion exchange resin and a strong-base anion exchange resin. In embodiments, the basic anion exchange resin comprises, consists of, or consists essentially of a weak-base anion exchange resin.

In embodiments, the method further comprises combining an aqueous alkali, the second aqueous aluminum complex composition, and further aqueous colloidal silica to provide an aqueous silica-alumina composition. In embodiments, the silica in the aqueous silica-alumina composition has a particle size of 3 nm to 150 nm. In some such embodiments, the method comprises combining the aqueous alkali, the second aqueous aluminum complex composition, the further aqueous silica, and one or more structure directing agents. In embodiments, the water-soluble aluminum salt comprises, consists of, or consists essentially of aluminum chlorohydrate. In embodiments, the aqueous alkali comprises, consists of, or consists essentially of aqueous sodium hydroxide, aqueous potassium hydroxide, or a mixture thereof. In embodiments, the aqueous colloidal silica and/or the further aqueous colloidal silica has a pH in the range from 1-11, a particle size of from about 3-150 nm, and/or a silica concentration of from about 15%-50% by weight. In embodiments, the first acid comprises, consists of, or consists essentially of acetic acid. In embodiments, the second acid comprises or consists essentially of acetic acid. In embodiments, the one or more structure directing agents is selected from the group consisting of N,N,N-trimethyl-1-adamantylammonium hydroxide, tetramethylammonium hydroxide, tetrapropylammonium hydroxide, tetraethylammonium hydroxide, tetrabutylammonium hydroxide, tetrahexylammonium hydroxide, tetraoctylammonium hydroxide, methyltributylammonium hydroxide, methyltriethylammonium hydroxide, phenyltrimethylammonium hydroxide, methyltripropylammonium hydroxide, dodecyltrimethylammonium hydroxide, hexadecyltrimethylammonium hydroxide, N-dodecyl N-ethyl N,N-dimethyl ammonium hydroxide, N,N-dimethyl N,N-diethyl ammonium hydroxide, and any combination thereof. In embodiments, the one or more structure directing agents comprises, consists of, or consists essentially of N,N,N-trimethyl-1-adamantylammonium hydroxide.

In embodiments, the method of the first embodiments further comprises: heating the aqueous silica-alumina composition under autogenous pressure at a temperature of between about 100° C. to about 250° C. for about 12 hours to about 24 hours to provide an aqueous zeolite composition comprising an uncalcined zeolite product. In embodiments, the method further comprises separating the uncalcined zeolite product from the aqueous zeolite composition. In some such embodiments, the separating comprises or consists of filtering the uncalcined zeolite product from the aqueous zeolite composition. In embodiments, the method further comprises washing the uncalcined zeolite product with an aqueous wash. In embodiments, the method further comprises heating the uncalcined zeolite product for 1 hour to 12 hours at 400° C. to 1000° C. to provide a calcined zeolite. In some embodiments, the structure direct agent consists of or consists essentially of N,N,N-trimethyl-1-adamantylammonium hydroxide and the calcined zeolite is a chabazite.

In embodiments, there is provided a composition comprising, consisting of, or consisting essentially of the aluminum-silica reaction product of any of the methods of the second embodiments disclosed herein.

In embodiments, there is provided a composition comprising, consisting of, or consisting essentially of the aluminum-silica effluent of any of the methods of the second embodiments disclosed herein.

In embodiments, there is provided a composition comprising, consisting of, or consisting essentially of the aqueous silica-alumina composition of any of the methods disclosed herein.

In embodiments, there is provided a composition comprising, consisting of, or consisting essentially of the aqueous zeolite composition of any of the methods described herein.

In embodiments, there is provided a composition comprising, consisting of, or consisting essentially of the uncalcined zeolite product of any of the methods disclosed herein.

In embodiments, there is provided the calcined zeolite of any of the methods disclosed herein.

In particular second embodiments, in a first step, an aqueous acidic solution of aluminum chlorohydrate or any other soluble aluminum salts including but not limited to: sulfate, nitrate, acetate, and bromate is combined with an aqueous colloidal silica with a pH in a range from about 1-11, preferably with a pH in a range from about 3-10, having a particle size from about 3-150 nm, preferably having a particle size from about 5-60, having a silica concentration from about 15-50%, preferably having a silica concentration of about 20-40%, and boric acid, acetic acid, lactic acid, or any other non-mineral acids including but not limited to other alpha-hydroxy carboxylic acids, at room temperature for a time of less than one hour to provide an aluminum-silica reaction product.

In a second step, the aluminum-silica reaction product is passed through a fixed bed of water-insoluble, weak-base anionic exchange resin in free base form to provide an aluminum-silica effluent.

In a third step, the aluminum-silica effluent is concentrated to provide the homogeneous aluminum-silica composite colloid having a solids concentration of about 35% or greater, having a Silica-To-Alumina Ratio (SAR) between about 1 to 500, preferably having a silica-to-alumina Ratio (SAR) between about 4 to 100, having a stability of more than one year, a cationic surface charge, and halides concentration below about 200 ppm, preferably a halides concentration in a range of about 10-150 ppm.

DESCRIPTION OF THE FIGURES

FIG. 1 is a schematic of a method of the First Embodiments.

FIG. 2 is a schematic of a method of the Second Embodiments.

FIG. 3 is a graphical representation of an $^{27}$Al NMR spectrum of a commercial dibasic aluminum acetate.

FIG. 4 is a graphical representation of an $^{27}$Al NMR spectrum of a first aqueous alumina complex of Example 2 prior to contact with an anion exchange resin, as described of this disclosure.

FIG. 5 is a graphical representation of an $^{27}$Al NMR spectrum of a second aqueous alumina complex formed by passing through an anion exchange resin, as described in Example 2 of this disclosure.

FIG. 6 is a digital scanning electron microscope image of the zeolite chabazite described in Example 4 of this disclosure.

FIG. 7 is a graphical representation of an $^{27}$Al NMR spectrum of an aluminum composite sol, as described in Example 8 of this disclosure.

FIG. 8 is a digital scanning electron microscope image of the zeolite chabazite, as described in Example 9 of this disclosure.

FIG. 9 is a digital scanning electron microscope image of the zeolite chabazite, as described in Example 9 of this disclosure.

FIG. 10 is a graphical representation of an $^{27}$Al NMR spectrum of a commercial dibasic aluminum acetate combined with an aqueous colloidal silica, as described in Example 10 of this disclosure.

DETAILED DESCRIPTION

Definitions

The following definitions are provided to determine how terms used in this application, and in particular how the claims, are to be construed. The organization of the definitions is for convenience only and is not intended to limit any of the definitions to any particular category.

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present invention. All publications, patent applications, patents and other references mentioned herein are incorporated by reference in their entirety. The materials, methods, and examples disclosed herein are illustrative only and not intended to be limiting.

The terms "comprise(s)", "include(s)", "having", "has", "can", "contain(s)", and variants thereof, as used herein, are intended to be open-ended transitional phrases, terms, or words that do not preclude the possibility of additional acts or structures. The singular forms "a", "and", and "the" include plural references unless the context clearly dictates otherwise. The present disclosure also contemplates other embodiments "comprising", "consisting of" and "consisting essentially of", the embodiments or elements presented herein, whether explicitly set forth or not.

The term "optional" or "optionally" means that the subsequently described component, event or circumstance may but need not be present or occur. The description therefore discloses and includes instances in which the event or circumstance occurs and instances in which it does not, or instances in which the described component is present and instances in which it is not.

The term "about" modifying, for example, the quantity of an ingredient in a composition, concentration, volume, temperature, time, yield, flow rate, pressure, and like values, and ranges thereof, employed in describing the embodiments of the disclosure, refers to variation in the numerical quantity that can occur, for example, through typical measuring and handling procedures used for making compounds, compositions, concentrates or use formulations; through inadvertent error in these procedures; through differences in the manufacture, source, or purity of starting materials or ingredients used to carry out the methods, through standard operating machine error, and like proximate considerations. The term "about" also encompasses amounts that differ due to aging of a formulation with a particular initial concentration or mixture, and amounts that differ due to mixing or processing a formulation with a particular initial concentration or mixture. Where modified by the term "about" the claims appended hereto include equivalents according to this definition.

The term "substantially" means "consisting essentially of", as that term is construed in U.S. patent law, and includes "consisting of" as that term is construed in U.S. patent law. For example, a solution that is "substantially free" of a specified compound or material may be free of that compound or material, or may have a minor amount of that compound or material present, such as through unintended contamination or incomplete purification. A "minor amount" may be a trace, an unmeasurable amount, an amount that does not interfere with a value or property, or some other amount as provided in context. A composition that has "substantially only" attached to a provided list of components may consist of only those components, or have a trace amount of some other component present, or have one or more additional components that do not materially affect the properties of the composition. Except where otherwise defined herein, "substantially" modifying, for example, the type or quantity of an ingredient in a composition, a property, a measurable quantity, a method, a value, or a range, employed in describing the embodiments of the disclosure, refers to a variation that does not affect the overall recited composition, property, quantity, method, value, or range thereof in a manner that negates an intended composition, property, quantity, method, value, or range. Where modified by the term "substantially" the claims appended hereto include equivalents according to this definition.

The term, "ppm" means parts per million. Except where otherwise noted, the term ppm refers to parts per million by weight. Except where otherwise noted, all concentrations recited herein are based on weight.

Unless otherwise stated, the term "acid" includes both concentrated acid not comprising water and acid comprising water.

The term "combustible anion" means an organic anion that on ignition burns producing carbon dioxide and water. In embodiments, the combustible anion does not comprise one or more halogen atoms. In one such embodiment, the combustible anion is acetate. In embodiments, on ignition the combustible anion burns without producing halides and/or hydrogen halides.

The term "colloid" or "colloidal system" means a substance containing ultra-small particles substantially evenly dispersed throughout another substance, the colloid consists of two separate phases: a dispersed phase (or sol or internal phase) and a continuous phase (or dispersion medium) within which the dispersed phase particles are dispersed, the dispersed phase particles may be solid, liquid, or gas, the dispersed-phase particles have a diameter of between approximately 1 and 1,000,000 nanometers, the dispersed-phase particles or droplets are affected largely by the surface chemistry present in the colloid, thus a colloid encompasses both the dispersed phase and the continuous phase.

The term "colloidal silica" means a colloid in which the primary dispersed-phase particles comprise silicon containing molecules, this definition includes the full teachings of the reference book: *The Chemistry of Silica: Solubility, Polymerization, Colloid and Surface Properties and Biochemistry of Silica*, by Ralph K Iler, John Wiley and Sons, Inc., (1979) (hereinafter "*Chemistry-Silica*") generally and also in particular pages 312-599, in general when the particles have a diameter of above 100 nm they are referred to as sols, aquasols, or nanoparticles.

The term "stable" means that the solid phase of the colloid is present, dispersed throughout the medium, and stable throughout this entire pH range with effectively no precipitate.

Unless specifically specified otherwise, the term "particle size" means average particle size as measured by laser diffraction for particles having an average size between 10 nm and 5 mm, and/or by dynamic light scattering for particles having an average particle size from 0.3 nm to 8 µm.

The term "SAR" means silica-to-aluminum ratio, and includes the ratio between alumina and silica molecules.

The term "complex" means an ion or molecule in which there is an atom and/or ion surrounded by ligands, wherein the coordination number of the atom and/or ion is larger than the formal oxidation number thereof. As used herein, "complex compound" means any compound comprising a complex. For example, $[Al_{13}O_4(OH)_{24}(H_2O)_{12}]^{7+}$ is one example of a complex (cation) and $[Al_{13}O_4(OH)_{24}(H_2O)_{12}]Cl_7$ is a complex compound.

As used herein, "Ka" and "pKa", unless otherwise specified, refer to the first acid dissociation constant and $-\log_{10}$ (common logarithm to base 10) thereof respectively. For example, unless otherwise specified, herein the pKa of citric acid means a pKa of about 3.143, being $-\log_{10}$ of the first dissociation constant of citric acid.

"Consisting essentially of" means that the methods and compositions may include additional steps, components, ingredients or the like, but only if the additional steps, components and/or ingredients do not materially alter the basic and novel characteristics of the claimed methods and compositions.

If the above definitions or a description stated in this application are inconsistent with a meaning (explicit or implicit) which is commonly used, in a dictionary, or stated in a source incorporated by reference into this application, the application and the claim terms in particular are understood to be construed according to the definition or description in this application, and not according to the common definition, dictionary definition, or the definition that was incorporated by reference. In light of the above, in the event that a term can only be understood if it is construed by a dictionary, if the term is defined by the *Kirk-Othmer Encyclopedia of Chemical Technology*, 5th Edition, (2005), (Published by Wiley, John & Sons, Inc.) this definition shall control how the term is to be defined in the claims. All illustrated chemical structures also include all possible stereoisomer alternatives.

Discussion

Aqueous Aluminum Complex Compositions of the First Embodiments

With reference to FIG. 1, in embodiments, there is provided a method of making an aqueous aluminum complex, the method comprising or consisting of combining a water-soluble aluminum salt 10 and first acid 12 in an aqueous blend to form a first aqueous aluminum complex composition 14; and contacting the first aqueous aluminum complex composition 14 with a water-insoluble anion exchange resin 20 to provide a second aqueous aluminum complex composition 22. The combining of the water-soluble aluminum salt 10 and the first acid 12 can be accomplished in any order. For example, the acid 12 can be an aqueous acid and the aqueous acid can be combined with the water-soluble aluminum salt 10 without further addition of water. Or an aqueous solution of the water-soluble salt 10 can be combined with an aqueous dilute acid or concentrated acid or mixture of acids. If the first acid 12 comprises more than one chemically distinct type of acid, each of the more than one chemically distinct acids can be combined with the aluminum salt 10 and/or with each other in any order of combination.

In some embodiments, the water-soluble salt 10 is selected from basic aluminum halide, aluminum sulfate, aluminum nitrate, neutral aluminum acetate, basic aluminum diacetate, aluminum bromate, or any combination thereof. In some such embodiments, the water-soluble aluminum salt 10 is a basic aluminum halide. In some such embodiments, the water-soluble salt 10 is a basic aluminum chloride. In some such embodiments, the water-soluble aluminum salt 10 comprises, consists of, or consists essentially of an aluminum chlorohydrate. In embodiments, the aluminum chlorohydrate has the general formula $Al_n(OH)_aO_bCl_c \cdot xH_2O$, wherein n is an integer of 1-30, a is an integer of 2-56, wherein b is an integer from 0 to 8, c is an integer from 1-18, and x is an integer of 0-26, and wherein 3n=a+2b+c. In some embodiments, the aluminum chlorohydrate has the approximate empirical formula $Al_2Cl(OH)_5$. Such general and empirical formulae may be conventional, and may not accurately reflect the structure or exact stoichiometry of elements in the compound. Furthermore, the formulae may represent mixtures of compounds having different atomic stoichiometries as well as single compounds having the stoichiometry. In some embodiments, the aluminum chlorohydrate comprises, consists of, or consists essentially of a complex compound having the formula $[Al_{13}O_4(OH)_{24}(H_2O)_{12}]Cl_7$.

In embodiments, the first acid 12 has a pKa of 3.0 to 10.0, in embodiments 3.5 to 9.5, or in embodiments 3.5 to 5.0. In embodiments, the first acid 12 comprises, consists of, or consists essentially of one or more acids, wherein each of the one or more acids has a pKa of 3.0 to 10. In embodiments, each of the one or more acids has a pKa 3.5 to 9.5, or in embodiments 3.5 to 5.5. In some embodiments, the first acid 12 comprises, consists of, or consists essentially of one or more carboxylic acids. In some such embodiments, the first acid 12 comprises, consists essentially of, or consists of acetic acid, lactic acid, boric acid, or any combination thereof. In embodiments, the first acid 12 comprises, consists of, or consists essentially of acetic acid or boric acid. In embodiments, the first acid 12 comprises, consists of, or consists essentially of an alpha-carboxylic acid. In embodiments, the first acid 12 comprises, consists of, or consists essentially of acetic acid.

In some embodiments, the contacting of the first aqueous aluminum complex composition 22 with the water-insoluble anion exchange resin 20 is effected by passing the first aqueous aluminum complex composition through a fixed bed of the water-insoluble anion exchange resin 20. In such embodiments, the method comprises the step of passing the first aqueous aluminum complex composition 14 through a fixed bed of the water-insoluble anion exchange resin 20. In some such embodiments, the method comprises passing the first aqueous aluminum complex composition 14 through a column of the water-insoluble anion exchange resin 20.

In some embodiments, contacting the first aqueous aluminum complex composition 14 with the water-insoluble anion exchange resin 20 is effected by stirring and/or agitating the resin in the first aqueous aluminum complex composition for a period of time. In some such embodiments, the period of time is one hour to 24 hours, or in embodiments, one minute to one hour, in embodiments 5 minutes to 60 minutes, in embodiments 1 minute to 5 minutes, or in embodiments about 30 minutes.

In embodiments, the water-insoluble anion exchange resin 20 is an anion exchange resin in which the anion comprises, consists essentially of, or consists of combustible counterions. In embodiments, the combustible counterions comprise, consist of, or consist essentially of one or more carboxylate ions. In some such embodiments, the carboxylate anions are selected from acetate and lactate. In one such embodiment, the combustible counterion comprises, consists of, or consists essentially of acetate.

In embodiments, the method further comprises the steps of preconditioning a basic anion exchange resin with a second acid 18 having a pKa of 3.0 to 10.0, in embodiments 3.5 to 9.5, or in embodiments 3.5 to 5.0 to provide the water-insoluble anion exchange resin 20. In some such embodiments, the preconditioning comprises or consists of passing the second acid 18 through a fixed bed of the basic anion exchange resin to provide the water-insoluble anion exchange resin. In some such embodiments, the fixed bed of the water-insoluble basic anion exchange resin comprises a column containing the basic anion exchange resin. In some embodiments, the second acid 18 has the same composition as the composition of the first acid 12, in other embodiments, the second acid 18 has a different composition from the composition of the first acid 12. In embodiments, the second acid 18 comprises one or more acids, wherein each of the one or more acids has a pKa from 3.0 to 10.0, in embodiments 3.5 to 9.5, or in embodiments 3.5 to 5.0. In embodiments, the second acid 18 comprises, consists of, or consists of one or more carboxylic acids. In embodiments, the second acid 18 comprises, consists of, or consists essentially of acetic acid, lactic acid, or a mixture thereof. In embodiments, the second acid 18 comprises, consists essentially of, or consists of acetic acid.

In some embodiments, the water-insoluble basic anion exchange resin comprises, consists of, or consists essentially of a strong-base anion exchange resin 16 in free base form. In some embodiments, the water-insoluble basic anion exchange resin comprises, consists of, or consists essentially of a weak-base anion exchange resin.

In some embodiments, the second aqueous aluminum complex composition 22 comprises, consists of, or consists essentially of one or more aluminum complexes and water. In embodiments, the proportion of atoms in the one or more aluminum complexes is or is about 4 Al:6 C:15 O:18H. In embodiments, the one or more aluminum complexes has the approximate empirical formula $Al_4(OH)_9(CH_3COO)_3$. In other embodiments, the one or more aluminum complexes has a different stoichiometry than 4 Al:9(OH):3($CH_3CO_2$) and does not have the empirical formula $Al_4(OH)_9(CH_3COO)_3$.

Advantageously and surprisingly, when the first aqueous aluminum complex composition is made by combining the aluminum salt 10 with acetic acid or boric acid, and then the first aqueous aluminum complex composition is contacted with a water-insoluble basic anion exchange resin having been preconditioned with acetic acid, the anion exchange resin removes most halide ions, thereby producing a second aqueous complex low in halide content, for example comprising total halide less than 200 ppm by weight less than 100 ppm, or less than 50 ppm, even when the water-soluble aluminum salt comprises, consists of, or consists essentially of a halide; for example when the salt comprises, consists of, or consists essentially of an aluminum halide such as aluminum chlorohydrate. Also advantageously and surprisingly, such a second aqueous aluminum complex composition comprises aluminum atoms and/or ions in octahedral and tetrahedral coordination environments, whereas the first aluminum complex composition before contact with the anion exchange resin preconditioned with acetic acid comprises aluminum atoms and/or ions in mostly or exclusively octahedral environments. The second aqueous aluminum complex compositions thus made, wherein the first acid and the second acid comprise acetic acid, is very high in elemental purity and has an unusual and advantageous structure with octahedrally coordinate and tetrahedrally coordinate aluminum. The unusual structure combined with the high purity imparts useful properties to the second aqueous aluminum complex composition thus made using acetic acid. For example, the composition can be used to make zeolites with a high phase purity, the zeolite particles having well-defined morphology and narrow particle distribution.

In embodiments, the second aqueous aluminum complex composition 22 comprises from about 300 ppm by weight halide ions to about 0 ppm by weight of halide ions, or about 250 ppm halide ions to about 0 ppm halide ions, or about 225 ppm to about 0 ppm halide ions, or about 210 ppm to about 0 ppm halide ions, or about 205 ppm to about 0 ppm halide ions, or from about 200 ppm to about 0 ppm halide ions by weight. In some such embodiments, the halide ions comprise, consist, or consists essentially of chloride ions.

In embodiments, the second aqueous aluminum complex composition 22 has a concentration of from about 1% to about 70% solids by weight. In embodiments, the second aqueous aluminum complex composition has a concentration of from about 1% to about 50% solids by weight. In embodiments, the second aqueous aluminum complex composition has a concentration of from about 1% to about 30% solids by weight, or about 1% to about 20%, or about 1% to about 15%, or about 1% to about 10%, or about 1% to about 5%, or about 3% to about 70%, or about 3% to about 50%, or about 3% to about 30%, or about 3% to about 20%, or about 3% to about 15%, or about 3% to about 10%, or about 3% to about 7%, or about 5% to about 70%, or about 5% to about 50%, or about 5% to about 30%, or about 5% to about 20%, or about 5% to about 15%, or about 5% to about 10%, or about 5% to about 7%, or about 10% to about 70%, or about 10% to about 50%, or about 10% to about 30%, or about 10% to about 20%, or about 15% to about 70%, or about 15% to about 50%, or about 15% to about 30%, or about 8% to about 15% solids by weight.

In embodiments, the method comprises concentrating or diluting the second aqueous complex composition so that the second aqueous complex composition 22 has a concentration of from about 1% to about 70% solids by weight, or about 1% to about 50% solids by weight, or about 1% to about 30% solids by weight, or about 1% to about 20%, or about 1% to about 15%, or about 1% to about 10%, or about 1% to about 5%, or about 3% to about 70%, or about 3% to about 50%, or about 3% to about 30%, or about 3% to about 20%, or about 3% to about 15%, or about 3% to about 10%, or about 3% to about 7%, or about 5% to about 70%, or about 5% to about 50%, or about 5% to about 30%, or about 5% to about 20%, or about 5% to about 15%, or about 5% to about 10%, or about 5% to about 7%, or about 10% to about 70%, or about 10% to about 50%, or about 10% to about 30%, or about 10% to about 20%, or about 15% to about 70%, or about 15% to about 50%, or about 15% to about 30%, or about 8% to about 15% solids by weight. In some such embodiments, the diluting comprises or consists of diluting with a solvent comprising, consisting of, or consisting essentially of water. In some embodiments, the concentrating comprises or consists of applying heat and/or reduced pressure to the second aqueous complex composition so that water and/or other volatiles evaporate and/or boil off from the second aqueous complex composition, thereby causing the concentration of the second aqueous complex composition to increase. In this context, applying heat means heating the second aqueous complex composition to a temperature of between about 25° C. and about 100° C. In this context, applying a reduced pressure means subjecting the second aqueous complex composition to a pressure of between about 0.95 atmospheres and about 0 atmospheres.

In some embodiments, the first aqueous aluminum complex composition 14 comprises water and one or aluminum complexes having aluminum atoms and/or ions in a predominantly or exclusively octahedral coordination environment. Surprisingly, in such embodiments the second aqueous aluminum complex comprises water and one or more aluminum complexes having aluminum atoms and/or ions in both octahedral and tetrahedral coordination environments.

In embodiments, the second aqueous aluminum complex composition 22 remains homogenous and stable at about 20° C. for 365 days: In this context, "remains homogenous and stable" means that for a period of at least 365 days, the second aqueous aluminum complex composition remains clear without developing a precipitate, turbidity, and without any change in viscosity thereof when the second aqueous complex composition is stored in a closed glass container from 17-25° C.

In embodiments, there is provided the second aqueous aluminum complex composition of any of the methods of the First Embodiments herein.

Aqueous Silica-Alumina Compositions of the First Embodiments

There is provided a method of making an aqueous silica-alumina composition 30, the method comprising: combining an aqueous alkali 24, any one of the second aqueous alumina compositions of the first embodiments, and an aqueous colloidal silica 28 to provide the aqueous silica-alumina composition 30.

In some embodiments, combining the aqueous alkali, the second aqueous aluminum complex composition, and the aqueous colloidal silica comprises or consists of combining aqueous alkali with the second aqueous aluminum complex composition to form a second mixture, and then combining the second mixture with the aqueous colloidal silica to provide the aqueous silica-alumina composition.

In other embodiments, combining the aqueous alkali, the second aqueous aluminum complex composition, and the aqueous colloidal silica comprises or consists of combining the aqueous alkali 24 with a structure directing agent 26 and mixing until a clear liquid is obtained, combining the clear liquid and the second aqueous aluminum complex composition 22 to form a third mixture, and then combining the third mixture with the aqueous colloidal silica 28 to provide the aqueous silica-alumina composition 30, as shown in FIG. 1.

In embodiments, the aqueous colloidal silica 28 has a pH in the range of 1-11, in embodiments 2-11, in embodiments 3-11, in embodiments 4-11, or 5-11, or 5-10, or 5-9.5, or 6 to 11, or 6-10, or 6-9.5, or 7-11, or 7-10, or 7-9.5, or 8-11, or 8-10, or 8-9.5, or about 9.5, or about 9.3. In embodiments, the aqueous colloidal silica comprises aqueous ammonia. In embodiments, the aqueous colloidal silica has a silica particle size of from about 1 nm to about 150 nm, in embodiments about 3 nm to about 120 nm, in embodiments about 5 nm to about 100 nm, in embodiments about 5 nm to about 80 nm, in embodiments about 10 nm to about 30 nm, in embodiments about 5 nm to about 60 nm, or in embodiments about 20 nm. In embodiments, the aqueous colloidal silica has a silica concentration from about 5% to about 65% by weight, in embodiments about 10% to about 60% by weight, in embodiments about 15% to about 50% by weight, in embodiments about 20% by weight to about 45% by weight, or about 30% to about 45% by weight, or about 35% by weight to about 40% by weight, or about 40% by weight.

In some embodiments of the method wherein a structure directing agent is used, the structure directing agent 26 is selected from N,N,N-trimethyl-1-adamantylammonium hydroxide, tetramethylammonium hydroxide, tetrapropylammonium hydroxide, tetraethylammonium hydroxide, tetrabutylammonium hydroxide, tetrahexylammonium hydroxide, tetraoctylammonium hydroxide, methyltributylammonium hydroxide, methyltriethylammonium hydroxide, phenyltrimethylammonium hydroxide, methyltripropylammonium hydroxide, dodecyltrimethylammonium hydroxide, hexadecyltrimethylammonium hydroxide, N-dodecyl N-ethyl N,N-dimethyl ammonium hydroxide, N,N-dimethyl N,N-diethyl ammonium hydroxide, or any combination thereof. In embodiments, the structure directing agent comprises, consists essentially of, or consists of N,N,N-trimethyl-1-adamantylammonium hydroxide. In some embodiments, the structure directing agent further comprises water.

In embodiments, the aqueous silica-alumina composition 30 has a silica-to-alumina ratio (SAR) from about 1 to about 500, in embodiments from about 4 to about 100, in embodiments about 5 to about 35, in embodiments about 10 to about 30, in embodiments about 20 to about 30, in embodiments about 25 to about 30, in embodiments about 10 to about 100, in embodiments about 10 to about 70, or in embodiments about 10 to about 50. In embodiments, the aqueous silica-alumina composition has a halide concentration between 0 and 200 ppm, in embodiments from about 10-150 ppm by weight. In embodiments, the aqueous silica-alumina composition has a molar composition of approximately 1.0 $SiO_2$:0.033 $Al_2O_3$:0.08 adamantylammonium hydroxide: 0.03 $Na_2O$:0.03 $K_2O$:14 $H_2O$. In embodiments, there is provided the aqueous alumina-silica composition 30 of any of the methods of the First Embodiments described herein.

Aluminum-Silica Compositions of the Second Embodiments

With reference to FIG. 2, in embodiments, there is provided a method of making an aqueous aluminum complex, the method comprising or consisting of combining in an aqueous blend a water-soluble aluminum salt 40, a first acid 42, and an aqueous colloidal silica 44 to form an aluminum-silica reaction product 46; and passing the aluminum-silica reaction product 46 through a fixed bed of a water-insoluble anion exchange resin 52 to provide an aluminum-silica effluent 54. The combining of the water-soluble aluminum salt 40, the aqueous colloidal silica 40, and the first acid 42 can be accomplished in any order—one such order is shown schematically in FIG. 2.

In some embodiments, the water-soluble aluminum salt 40 is selected from basic aluminum halide, aluminum sulfate, aluminum nitrate, neutral aluminum acetate, basic aluminum diacetate, aluminum bromate, or any combination thereof. In some such embodiments, the water-soluble aluminum salt 40 is a basic aluminum halide. In some such embodiments, the water-soluble salt 40 is a basic aluminum chloride. In some such embodiments, the water-soluble aluminum salt 40 comprises, consists of, or consists essentially of an aluminum chlorohydrate. In embodiments, the aluminum chlorohydrate has the general formula $Al_n(OH)_aO_bCl_c \cdot xH_2O$, wherein n is an integer of 1-30, a is an integer of 2-56, wherein b is an integer from 0 to 8, c is an integer from 1-18, and x is an integer of 0-26, and wherein 3n=a+2b+c. In some embodiments, the aluminum chlorohydrate has the approximate empirical formula $Al_2Cl(OH)_5$. Such general and empirical formulae may be conventional, and may not accurately reflect the structure or exact stoichiometry of elements in the compound. Furthermore, the formulae may represent mixtures of compounds having different atomic stoichiometries as well as single compounds having the stoichiometry. In some embodiments, the aluminum chlorohydrate comprises, consists of, or consists essentially of a complex compound having the formula $[Al_{13}O_4(OH)_{24}(H_2O)_{12}]Cl_7$.

In embodiments, the aqueous colloidal silica 44 has a pH in the range of 1-11, in embodiments 2-11, in embodiments 3-11, in embodiments 4-11, or 5-11, or 5-10, or 5-9.5, or 6 to 11, or 6-10, or 6-9.5, or 7-11, or 7-10, or 7-9.5, or 8-11, or 8-10, or 8-9.5, or about 9.5, or about 9.3. In embodiments, the aqueous colloidal silica 44 comprises aqueous ammonia. In embodiments, the aqueous colloidal silica 44 comprises silica having a In embodiments, the aqueous colloidal silica has a silica particle size of from about 1 nm to about 150 nm, in embodiments about 3 nm to about 120 nm, in embodiments about 5 nm to about 100 nm, in embodiments about 5 nm to about 80 nm, in embodiments about 10 nm to about 30 nm, in embodiments or about 5 nm to about 60 nm, or in embodiments about 20 nm. In embodiments, the aqueous colloidal silica 44 has a silica concentration from about 5% to about 65% by weight, in embodiments about 10% to about 60% by weight, in embodiments about 15% to about 50% by weight, in embodiments about 20% by weight to about 45% by weight, or about 30% to about 45% by weight, or about 35% by weight to about 40% by weight, or about 40% by weight.

In embodiments, the first acid 42 has a pKa of 3.0 to 10, in embodiments 3.5 to 9.5, or in embodiments 3.5 to 5.0. In embodiments, the first acid 42 comprises, consists of, or consists essentially of one or more acids, wherein each of the one or more acids has a pKa of about 3.0 to 10, in embodiments 3.5 to 9.5, or in embodiments 3.5 to 5.0. In some embodiments, the first acid 42 comprises, consists of, or consists essentially of one or more carboxylic acids. In embodiments, the first acid 42 comprises, consists essentially of, or consists of acetic acid, lactic acid, boric acid, or any combination thereof. In embodiments, the first acid 42 comprises, consists of, or consists essentially of acetic acid or boric acid. In embodiments, the first acid 42 comprises, consists of, or consists essentially of an alpha-carboxylic acid. In embodiments, the first acid 42 comprises, consists of, or consists essentially of acetic acid.

In embodiments, the water-insoluble anion exchange resin 52 is an anion exchange resin in which the anion comprises, consists essentially of, or consists of combustible counterions. In embodiments, the combustible counterions comprise, consist of, or consist essentially of one or more carboxylate ions. In some such embodiments, the carboxylate anions are selected from acetate and lactate. In one such embodiment, the combustible counterion comprises, consists of, or consists essentially of acetate.

In embodiments, the method further comprises the steps of preconditioning a basic anion exchange resin with a second acid 50, wherein the second acid 50 has a pKa of 3.0 to 10.0 to provide the water-insoluble anion exchange resin. In some such embodiments, the preconditioning comprises or consists of passing the second acid 50 through a fixed bed of the basic anion exchange resin to provide the water-insoluble anion exchange resin 52. In some such embodiments, the fixed bed of the basic anion exchange resin comprises a column containing the basic anion exchange resin. In some embodiments, the second acid 50 has the same composition as the composition of the first acid 42, in other embodiments, the second acid 50 has a different composition from the composition of the first acid 42. In embodiments, the second acid 50 has a pKa from 3.5 to 9.5, or in embodiments 3.5 to 5.0. In embodiments, the second acid 50 comprises, consists of, or consists of one or more carboxylic acids. In embodiments, the second acid 50 comprises, consists of, or consists essentially of acetic acid, lactic acid, or a mixture thereof. In embodiments, the second acid 50 comprises, consists essentially of, or consists of acetic acid.

In some embodiments, the basic anion exchange resin comprises, consists of, or consists essentially of a strong-base anion exchange resin. In some embodiments, the water-insoluble basic anion exchange resin comprises, consists of, or consists essentially of a weak-base anion exchange resin 48.

Advantageously and surprisingly, when the aluminum-silica reaction product 46 is made by combining the aluminum salt with acetic acid and/or lactic acid, and then the aluminum-silica reaction product is passed through a fixed bed of a water-insoluble anion exchange resin having been preconditioned with acetic acid, the anion exchange resin removes most halide ions, thereby producing an aluminum-silica effluent having low halide content, for example comprising total halide less than 200 ppm by weight less than 100 ppm, or less than 50 ppm, even when the water-soluble aluminum salt comprises, consists of, or consists essentially of a halide; for example when the salt comprises, consists of, or consists essentially of an aluminum halide such as aluminum chlorohydrate. Also advantageously and surprisingly, such an aluminum-silica effluent comprises aluminum atoms and/or ions in both octahedral and tetrahedral coordination environments. The aluminum-silica effluents thus made, wherein the first acid and the second acid each comprise acetic acid, are very high in elemental purity and has an unusual and advantageous structure with octahedrally coordinate and tetrahedrally coordinate aluminum. The unusual structure combined with the high purity imparts useful properties to the aluminum-silica effluent. For example, the effluent can be used to make zeolites with a high phase purity, the zeolite particles having well-defined morphology and narrow particle distribution. The effluent can be diluted with a solvent or solvent mixture, for example a solvent or solvent mixture comprising, consisting of, or consisting essentially of water, before use in the synthesis of a zeolite.

In embodiments, the aluminum-silica effluent 54 comprises from about 300 ppm by weight halide ions to about 0 ppm by weight of halide ions, or about 250 ppm halide ions to about 0 ppm halide ions, or about 225 ppm to about 0 ppm halide ions, or about 210 ppm to about 0 ppm halide ions, or about 205 ppm to about 0 ppm halide ions, or from about 200 ppm to about 0 ppm halide ions by weight. In some such embodiments, the halide ions comprise, consist, or consists essentially of chloride ions.

In embodiments, the aluminum-silica effluent 54 eluted from the fixed bed has a concentration of from about 1% to about 70% solids by weight. In embodiments, the aluminum-silica effluent eluted from the fixed bed has a concentration of from about 1% to about 50% solids by weight. In embodiments, the aluminum-silica effluent eluted from the fixed bed has a concentration of from about 1% to about 30% solids by weight, or about 1% to about 20%, or about 1% to about 15%, or about 1% to about 10%, or about 1% to about 5%, or about 3% to about 70%, or about 3% to about 50%, or about 3% to about 30%, or about 3% to about 20%, or about 3% to about 15%, or about 3% to about 10%, or about 3% to about 7%, or about 5% to about 70%, or about 5% to about 50%, or about 5% to about 30%, or about 5% to about 20%, or about 5% to about 15%, or about 5% to about 10%, or about 5% to about 7%, or about 10% to about 70%, or about 10% to about 50%, or about 10% to about 30%, or about 10% to about 20%, or about 15% to about 70%, or about 15% to about 50%, or about 15% to about 30%, or about 8% to about 15% solids by weight.

In embodiments, the method comprises concentrating or diluting the aluminum-silica effluent 54 eluted from the fixed bed so that aluminum-silica effluent 54 after concentration or dilution has a concentration of from about 1% to about 70% solids by weight, or about 1% to about 50% solids by weight, or about 1% to about 30% solids by weight, or about 1% to about 20%, or about 1% to about 15%, or about 1% to about 10%, or about 1% to about 5%, or about 3% to about 70%, or about 3% to about 50%, or about 3% to about 30%, or about 3% to about 20%, or about 3% to about 15%, or about 3% to about 10%, or about 3% to about 7%, or about 5% to about 70%, or about 5% to about 50%, or about 5% to about 30%, or about 5% to about 20%, or about 5% to about 15%, or about 5% to about 10%, or about 5% to about 7%, or about 10% to about 70%, or about 10% to about 50%, or about 10% to about 30%, or about 10% to about 20%, or about 15% to about 70%, or about 15% to about 50%, or about 15% to about 30%, or about 8% to about 15% solids by weight. In some such embodiments, the diluting comprises or consists of diluting with a solvent comprising, consisting of, or consisting essentially of water. In some embodiments, the concentrating comprises or consists of applying heat and/or reduced pressure to the aluminum-silica effluent so that water and/or other volatiles evaporate and/or boil off from the aluminum-silica effluent, thereby causing the concentration of the aluminum-silica effluent composition to increase. In this context, applying heat means heating the second aqueous complex composition to a temperature of between about 25° C. and about 100° C. In this context, applying a reduced pressure means subjecting the second aqueous complex composition to a pressure of between about 0.95 atmospheres and about 0 atmospheres.

In embodiments, the aluminum-silica effluent 54 remains homogenous and stable at about 20° C. for 365 days: In this context, "remains homogenous and stable" means that for a period of at least 365 days, the second aqueous aluminum complex composition remains clear without developing a precipitate, turbidity, and without any change in viscosity thereof when the second aqueous complex composition is stored in a closed glass container from 17-25° C.

In embodiments, there is provided the aluminum-silica effluent 54 of any of the methods of the Second Embodiments herein.

Aqueous Silica-Alumina Compositions of the Second Embodiments

There is provided a method of making an aqueous silica-alumina composition 62, the method comprising: combining any one of the aluminum-silica effluents 54 of the Second Embodiments, an aqueous alkali 56, and a further aqueous colloidal silica 60 to provide an aqueous silica-alumina composition 62.

In embodiments, the order of combination is as follows: the aqueous alkali 56 is combined with a structure directing agent 58 (if used) and then with the aluminum-silica effluent 54 and the combination mixed. Then the combination is combined with the further aqueous colloidal silica 60 to provide the aqueous silica-alumina composition 62.

The aqueous silica-alumina compositions 30 of the first embodiments are chemically different from the aqueous silica-alumina compositions 62 of the second embodiments. However, the aqueous silica-alumina compositions of both the first and second embodiments can be used to make zeolites having excellent crystallinity and uniformity of morphology.

In embodiments, the further aqueous colloidal silica 60 has a pH in the range of 1-11, in embodiments 2-11, in embodiments 3-11, in embodiments 4-11, or 5-11, or 5-10, or 5-9.5, or 6 to 11, or 6-10, or 6-9.5, or 7-11, or 7-10, or 7-9.5, or 8-11, or 8-10, or 8-9.5, or about 9.5, or about 9.3. In embodiments, the aqueous colloidal silica 60 comprises aqueous ammonia. In embodiments, the further aqueous colloidal silica 60 has a silica particle size of from about 3 nm to about 150 nm, in embodiments about 10 nm to about 30 nm, in embodiments about 5 nm to about 60 nm, or in embodiments about 20 nm. In embodiments, the further aqueous colloidal silica 60 has a silica concentration from about 5% to about 65% by weight, in embodiments about 10% to about 60% by weight, in embodiments about 15% to about 50% by weight, in embodiments about 20% by weight to about 45% by weight, or about 30% to about 45% by weight, or about 35% by weight to about 40% by weight, or about 40% by weight. In some embodiments, the further aqueous silica 60 has the same composition as the aqueous colloidal silica 44 used to make the aluminum-silica reaction product, in other embodiments different.

In some embodiments, the combining of the aqueous alkali 56 and the alumina-silica effluent 54 comprises or consists of combining the aqueous alkali 56, the aluminum-silica effluent 54, and a structure directing agent 58. In embodiments, the order of combination is as follows: the aqueous alkali 56 is combined with the structure directing agent 58 to form a first mixture, then the aluminum-silica effluent 54 is added to the first mixture with mixing to provide a second mixture. Then the second mixture is combined with the further aqueous colloidal silica 60 to provide the silica-alumina composition 62. This particular order is shown schematically in FIG. 2. In embodiments, the silica-alumina composition 62 is mixed for a further period of time, wherein the period of time is 30 minutes to 3 hours, or 1 hour to 3 hours, or about 2 hours.

In some embodiments of the method wherein a structure directing agent 58 is used, the structure directing agent is selected from N,N,N-trimethyl-1-adamantylammonium hydroxide, tetramethylammonium hydroxide, tetrapropylammonium hydroxide, tetraethylammonium hydroxide, tetrabutylammonium hydroxide, tetrahexylammonium hydroxide, tetraoctylammonium hydroxide, methyltributylammonium hydroxide, methyltriethylammonium hydroxide, phenyltrimethylammonium hydroxide, methyltripropylammonium hydroxide, dodecyltrimethylammonium hydroxide, hexadecyltrimethylammonium hydroxide, N-dodecyl N-ethyl N,N-dimethyl ammonium hydroxide, N,N-dimethyl N,N-diethyl ammonium hydroxide, or any combination thereof. In embodiments, the structure directing agent 58 comprises, consists essentially of, or consists of N,N,N-trimethyl-1-adamantylammonium hydroxide. In some embodiments, the structure directing agent further comprises water.

In embodiments, the aqueous silica-alumina composition 62 has a silica-to-alumina ratio (SAR) from about 5 to about 35, in embodiments about 10 to about 30, in embodiments about 20 to about 25. In embodiments, the aqueous silica-alumina composition has a halide concentration between 0 and 200 ppm, in embodiments from about 10-150 ppm by weight. In embodiments, the aqueous silica-alumina composition has a molar composition of approximately 1.0 $SiO_2$:0.04 $Al_2O_3$:0.08 adamantylammonium hydroxide:0.03 $Na_2O$:0.03 $K_2O$.

In embodiments, there is provided the aqueous alumina-silica composition 62 of any of the methods of the Second Embodiments described herein.

Zeolites and Methods of Making Thereof

In embodiments, there is provided a method of making an aqueous zeolite composition, the method comprising: heating any one of the aqueous silica-alumina compositions (including 30 and 62) described herein to form an aqueous zeolite composition. In some such embodiments, the method comprises heating the aqueous silica-alumina composition at elevated pressure to provide an aqueous zeolite composition comprising a zeolite and water. In this context, elevated pressure means that the pressure of the aqueous silica-alumina composition is higher than 1 atmosphere. Heating the aqueous silica-alumina composition under elevated pressure can be accomplished by methods known in the art, such as by placing the aqueous silica-alumina composition in a reaction vessel and heating the aqueous silica—pressure is applied to the contents of the reaction vessel, or the reaction vessel is sealed and the reaction carried out at autogenous pressure, and/or the autogenous pressure is regulated and/or modified by releasing or applying further pressure. In embodiments, the aqueous alumina-silica composition is heated at between about 100° C. and 250° C., in embodiments between about 125° C. and about 225° C., in embodiments between about 150° C. and about 200° C., or at about 170° C. for about eight hours to about two days, or for about 12 hours to about 24 hours, or for about 13 hours to about 20 hours, or for about 15 hours to about 20 hours, or for about 16 hours to form the aqueous zeolite composition. In any such embodiments, heating the aqueous zeolite composition is conducted in a sealed reactor at autogenous pressure. In embodiments, the aqueous silica-alumina composition is heated at a pressure of 1 atmosphere to 20 atmospheres, in embodiments, 1 atmosphere to 15 atmospheres, in embodiments 5 atmospheres to 15 atmospheres, in embodiments 10 atmospheres to 15 atmospheres, in embodiments 5 atmospheres to 20 atmospheres, or in embodiments 10 atmospheres to 20 atmospheres.

In embodiments, there is provided the aqueous zeolite composition of any of the methods described herein.

In embodiments, there is provided a method of making an uncalcined zeolite product, the method comprising filtering the aqueous zeolite composition of any of the embodiments described herein to provide an uncalcined zeolite product and optionally washing the uncalcined zeolite product. In embodiments, the washing is washing with water. In embodiments, there is provided the uncalcined zeolite product.

In embodiments, there is provided a method of making a calcined zeolite product, the method comprising heating the uncalcined zeolite product to form the calcined zeolite product. In embodiments, the heating is carried out at from 400° C. to about 1,000° C., in embodiments about 500° C.

to about 900° C., in embodiments about 500° C. to about 800° C., or about 500° C. to about 700° C. or from about 200° C. to about 700° C., or about 300° C. to about 700° C., or about 400° C. to about 700° C., or about 600° C. In some such embodiments, the heating is carried out for from about one hour to about one week, in embodiments from about one hour to about one day, in embodiments from about one hour to about 17 hours, in embodiments from about one hour to about 16 hours, or from about one hour to about 12 hours, or from about one hour to about ten hours, or from about one hour to about seven hours, or about six hours.

In some embodiments, the calcination is carried out in oxygen or air. In some such embodiments, the uncalcined zeolite comprises organic material that burns during the calcination. In some such embodiments, the organic material comprises one or more conjugate anions of the first acid and/or of the one or more carboxylic acids in the second acid. In some embodiments, the organic material comprises the structure directing agent.

In some embodiments, the calcination is carried out in nitrogen. In some embodiments, the calcination is carried out anaerobically.

In embodiments, there is provided the calcined zeolite. In embodiments, the calcined zeolite product comprises, consists of, or consists essentially of a chabazite.

In embodiments, the calcined zeolite product has a silica-to alumina ratio of about 5 to about 35, in embodiments about 10 to about 30, or in embodiments about 25 to about 30.

In embodiments, the structure directing agent comprises, consists of, or consists essentially of N,N,N-trimethyl-1-adamantylammonium hydroxide and the zeolite comprises, consists of, or consists essentially of a chabazite. In embodiments, the structure directing agent consists of or consists essentially of N,N,N-trimethyl-1-adamantylammonium hydroxide and the zeolite is a chabazite.

Uses of the Aqueous Alumina Complex Compositions

In embodiments, there is provided a use of any of the second aqueous aluminum complex compositions or any of the aluminum-silica effluents described herein in the production of a zeolite, an abrasive, a binder, a refractory, or a coating. In embodiments, there is provided the use any of the second aqueous complex compositions or any of the aluminum-silica effluent compositions described herein in wastewater treatment.

A Further Description of Embodiments

In third embodiments, there is provided a method comprising, in order: combining in an aqueous blend a water-soluble aluminum salt and a first acid having a pKa of 3.5 to 9.5 to form a first aqueous aluminum complex composition; contacting the first aqueous aluminum complex composition with a water-insoluble anion exchange resin to provide a second aqueous aluminum complex composition; optionally diluting or concentrating the second aqueous aluminum complex composition; and combining the second aqueous aluminum complex composition with an aqueous alkali, an aqueous colloidal silica, and optionally a structure directing agent to form an aqueous silica-alumina composition, wherein the structure directing agent is selected from the group consisting of N,N,N-trimethyl-1-adamantylammonium hydroxide, tetramethylammonium hydroxide, tetrapropylammonium hydroxide, tetraethylammonium hydroxide, tetrabutylammonium hydroxide, tetrahexylammonium hydroxide, tetraoctylammonium hydroxide, methyltributylammonium hydroxide, methyltriethylammonium hydroxide, phenyltrimethylammonium hydroxide, methyltripropylammonium hydroxide, dodecyltrimethylammonium hydroxide, hexadecyltrimethylammonium hydroxide, N-dodecyl N-ethyl N,N-dimethyl ammonium hydroxide, N,N-dimethyl N,N-diethyl ammonium hydroxide, and any combination thereof. In embodiments, there is provided the second aqueous aluminum complex composition of any of the third embodiments. In some third embodiments, the water-soluble aluminum salt comprises, consists of, or consists essentially of aluminum chlorohydrate. In some third embodiments, the aqueous silica-alumina composition comprises silica having a particle size of 3 nm to 150 nm.

In fourth embodiments, there is provided a method comprising, in order: combining in an aqueous blend a water-soluble aluminum salt, a first acid having a pKa of 3.5 to 9.5, and an aqueous colloidal silica to form an aluminum-silica reaction product; passing the aluminum-silica reaction product through a fixed bed of a water-insoluble anion exchange resin to provide an aluminum-silica effluent; optionally diluting or concentrating the aluminum-silica effluent; and combining the aluminum-silica effluent with an aqueous alkali, further aqueous colloidal silica, and optionally a structure directing agent to form an aqueous silica-alumina composition, wherein the structure directing agent is selected from the group consisting of N,N,N-trimethyl-1-adamantylammonium hydroxide, tetramethylammonium hydroxide, tetrapropylammonium hydroxide, tetraethylammonium hydroxide, tetrabutylammonium hydroxide, tetrahexylammonium hydroxide, tetraoctylammonium hydroxide, methyltributylammonium hydroxide, methyltriethylammonium hydroxide, phenyltrimethylammonium hydroxide, methyltripropylammonium hydroxide, dodecyltrimethylammonium hydroxide, hexadecyltrimethylammonium hydroxide, N-dodecyl N-ethyl N,N-dimethyl ammonium hydroxide, N,N-dimethyl N,N-diethyl ammonium hydroxide, and any combination thereof. In some such embodiments, the water-soluble aluminum salt comprises, consists of, or consists essentially of aluminum chlorohydrate. In some fourth embodiments, the aqueous silica-alumina composition comprises silica having a particle size of 3 nm to 150 nm.

In fifth embodiments, there is provided the method of the third embodiments or the method of the fourth embodiments, wherein the aqueous silica-alumina composition includes the structure directing agent, and the structure directing agent is N,N,N-trimethyl-1-adamantylammonium hydroxide.

In sixth embodiments, there is provided the method of any one of the third to fifth embodiments, wherein the aqueous alkali is selected from the group consisting of aqueous sodium hydroxide, aqueous potassium hydroxide, and a combination thereof.

In seventh embodiments, there is provided the method of any one of the third to sixth embodiments, wherein the method further comprises preconditioning a basic anion exchange resin with a second acid having a pKa of 3.5 to 9.5 to provide the water-insoluble anion exchange resin. In some such embodiments, the first acid and the second acid are individually selected from the group consisting of acetic acid, boric acid, lactic acid, and any combination thereof. In some such embodiments, the second acid comprises, consists of, or consists essentially of acetic acid.

In eighth embodiments, in the method of any one of the third to seventh embodiments claims 1 and 3-9, wherein silica in the aqueous silica-alumina composition has a particle size of 3 nm to 150 nm.

In ninth embodiments of the method, the method of any one of the third to eighth embodiments further comprises heating the aqueous silica-alumina composition under autogenous pressure at a temperature between 100° C. and 250° C., in embodiments between 30° C. and 300° C., in embodiments between 150° C. and 250° C., in embodiments between 50° C. and 100° C., in embodiments between 100° C. and 150° C., in embodiments between 150° C. and 200° C., for 12 hours to 24 hours, in embodiments about 6 hours to about 48 hours, in embodiments about 6 hours to about 12 hours, or in embodiments about 12 hours to about 36 hours to provide an aqueous zeolite composition comprising an uncalcined zeolite product. In some ninth embodiments, the aqueous silica alumina composition is heated for 15 hours at 160° C. or 18 hours at 170° C.

In tenth embodiments of the method, the method of the ninth embodiments further comprises separating the uncalcined zeolite product from the aqueous zeolite composition, and washing the uncalcined zeolite product.

In eleventh embodiments of the method, the method of any one of the ninth or tenth embodiments further comprises heating the uncalcined zeolite product for 1 hour to 12 hours, in embodiments 4 hours to 8 hours, in embodiments 6 hours to 18 hours, in embodiments 4 hours to 12 hours, or in embodiments for 6 hours at 400° C. to 1000° C., in embodiments 300° C. to 1200° C., in embodiments 400° C. to 800° C., in embodiments 500° C. to 700° C., or about 600° C. to provide a calcined zeolite.

In twelfth embodiments, the aqueous silica-alumina composition of the eleventh embodiments includes the structure directing agent, the structure directing agent is N,N,N-trimethyl-1-adamantylammonium hydroxide, and the calcined zeolite is a chabazite.

In embodiments, there is provided the calcined zeolite of the eleventh or the twelfth embodiments.

The foregoing may be better understood by reference to the following examples, which are presented for purposes of illustration and are not intended to limit the scope of the invention. In particular the examples demonstrate representative examples of principles innate to the invention and these principles are not strictly limited to the specific condition recited in these examples. As a result it should be understood that the invention encompasses various changes and modifications to the examples described herein and such changes and modifications can be made without departing from the spirit and scope of the invention and without diminishing its intended advantages. It is therefore intended that such changes and modifications be covered by the appended claims.

Example 1

A $^{27}$Al nuclear magnetic resonance (NMR) spectrum of an aqueous solution of a commercial dibasic aluminum acetate was run, the solution having a pH of between 4 and 5. The spectrum is shown in FIG. 3. The appearance of a single peak centered close to 0 ppm indicated the presence of an octahedrally coordinate aqueous aluminum complex ion such as $[Al(H_2O)_6]^{3+}$.

Example 2: Preparation of an Aqueous Aluminum Complex

A starting mixture was prepared by blending the following ingredients: distilled water (200 g), boric acid ($H_3BO_3$) (8 g), and aqueous aluminum chlorohydrate solution (450 g of aqueous solution having 12.4% by weight solids with respect to aluminum). The mixture was allowed to mix at room temperature for one hour. A $^{27}$Al nuclear magnetic resonance of spectrum of such a starting mixture having a pH of between 4 and 5 was run and is shown in FIG. 4. The spectrum shows a peak centered close to 0 ppm having at least one shoulder and a second maximum, suggesting the starting mixture comprises a mixture of aluminum atoms and/or ions having octahedral coordination. (Such a mixture of aluminum atoms and/or ions could be present in a single aluminum species or a mixture of aluminum species.)

Dowex Monosphere™ 550A OH insoluble anion exchange resin in hydroxide form having total capacity of 3 moles was packed into a column. The anion exchange resin was pre-conditioned with an acetic acid solution consisting of distilled water (5000 g) and acetic acid (100 g) by passing the acetic acid solution through the column.

Then the starting mixture was passed through the column of the water-insoluble anion exchange resin. The effluent collected from the outlet of the column had a solid concentration of 1-8% (with respect to aluminum). The liquid was further concentrated to 15% by evaporation under reduced pressure. The liquid remained homogeneous and stable at room temperature for at least 365 days, as judged by accelerated aging tests.

Ion chromatographic analysis indicated that chloride in the final product was below 200 ppm. A sample of the aqueous final product maintained a homogeneous appearance, i.e. no apparent gelation, on contacting with aqueous media having a pH ranging from 2-13.

An $^{27}$Al NMR spectrum was run on a sample of the final aqueous product having a pH of between 4 and 5. The spectrum is shown in FIG. 5. The spectrum (FIG. 5) was quite different in appearance from that of the starting mixture added to the column (FIG. 4). The spectrum exhibited a smaller peak whose maximum was centered on about 65 ppm and a larger peak whose maximum was centered at about 10 ppm with a shoulder at about 0 ppm. The smaller peak centered on about 65 ppm is believed to indicate the presence of tetrahedrally coordinated aluminum atoms and/or ions, whereas the larger peak with shoulder at about 10 ppm indicated the presence of a mixture/combination of octahedrally coordinated aluminum atoms and/or ions.

Inductively coupled plasma mass spectrometry in combination with $^1$H NMR indicated that excluding water, the stoichiometry of the final product was approximately 4 Al:9O:9H:3 acetate, the final product (whether mixture or single compound) having an approximate empirical formula of $Al_4(OH)_9(CH_3CO_2)_3$.

Example 3: Preparation of an Aqueous Aluminum Complex

A starting mixture was prepared by blending the following ingredients: distilled water (200 g), glacial acetic acid (75 g), and aqueous aluminum chlorohydrate solution (450 g, 12.4% by weight with respect to aluminum). The starting mixture was allowed to mix at room temperature for one hour.

Dowex Monosphere™ 550A OH insoluble anion exchange resin in hydroxide form having total capacity of 3 moles was packed into a column. The anion exchange resin was pre-conditioned with an acetic acid solution consisting of distilled water (5,000 g) and glacial acetic acid (100 g) by passing the acetic acid solution through the column.

Then the starting mixture was passed through the column of pre-conditioned anion exchange resin. The effluent collected from the outlet of the column had a solids concentration of 1-8% (with respect to aluminum). The liquid was further concentrated to 15% by evaporation under reduced pressure. The liquid remained homogeneous and stable at room temperature for at least 365 days. Ion chromatographic analysis indicated that chloride in the final product was below 200 ppm.

Example 4: Preparation of Zeolite

Sodium hydroxide (0.88 g) and potassium hydroxide (1.24 g) were dissolved in distilled water (30 g) and 25% by weight aqueous adamantylammonium hydroxide (25 g) was mixed in. The mixture was stirred until a clear solution was obtained.

Then, 12.4 g aluminum acetate solution made by using process in Example 3 and having 10% $Al_2O_3$ equivalent was added with stirring. After stirring for 30 min, aqueous colloidal silica (54 g of Nalco 2327, 40.6% silica) was added. The final mixture, having a molar stoichiometry of 1.0 $SiO_2$:0.033 $Al_2O_3$:0.08 adamantylammonium:0.03 $Na_2O$:0.03 $K_2O$:14$H_2O$ was stirred for two more hours and loaded into a reactor (Parr, 300 ml) for crystallization of chabazite. The crystallization was conducted at 170° C. for 16 hours under constant agitation and autogenous pressure. The solid product was recovered by filtration, extensive washing and drying at room temperature. Calcination of the solid product was conducted at 600° C. for six hours under air flow. X-ray diffraction analysis showed that the solid product had a pure chabazite phase. Scanning electron microscopy (SEM) was run on the solid product. The resultant scanning electron micrograph is shown in FIG. 6, and shows that the crystallized product had a well-defined cubic morphology falling into 1-3 micron regime in size. X-ray fluorescence analysis confirmed a silica-to-alumina ratio of 30.

Example 5: Preparation of Aluminum-Silica Composite Colloid

A starting mixture was prepared by blending the following ingredients: 60 g $H_2O$, 3.4 g acetic acid, 10.3 g lactic acid, 24.84 g aluminum chlorohydrate solution (12.4% Al) and 100 g of Nalco 1034A (commercial colloidal silica from Nalco, 34.4% solid, 20 nm particle size, pH=4). The mixture was allowed to mix at room temperature for one hour. Then the mixture was passed through a column filled with insoluble weak-base anionic resin (Diaion WA30, Mitsubishi Chemical Corp., www.dianion.com) in free base form having total capacity of greater than 0.15 mole. The effluent liquid from the column was collected and concentrated by evaporation under reduced pressure to achieve a solid concentration of 35 wt %. The silica-to-alumina ratio was determined by XRF to be 10. Ion chromatographic analysis indicated that chloride concentration in the final product is below 200 ppm. Based on an accelerated aging study, the concentrated sol is stable up to 12 months at room temperature.

Example 6: Preparation of Aluminum-Silica Composite Colloid

A starting mixture was prepared by blending the following ingredients: 160 g $H_2O$, 6.9 g acetic acid, 5.15 g lactic acid, 24.84 g aluminum chlorohydrate solution (12.4% Al) and 200 g of Nalco 1034A (commercial colloidal silica from Nalco, 34.4% solid, 20 nm particle size, pH=4). The mixture was allowed to mix at room temperature for one hour and was then passed through a column filled with insoluble weak-base anionic resin (Diaion WA30, Mitsubishi Chemical Corp., www.dianion.com) in free base form having total capacity of greater than 0.15 mole. The effluent liquid from the column was collected and concentrated by evaporation under reduced pressure to achieve a solids concentration of 35 wt %. The silica-to-alumina ration was determined by XRF to be 20. Ion chromatographic analysis indicated that chloride concentration in the final product is below 200 ppm. Based on an accelerated aging study, the concentrated sol is stable up to 12 months at room temperature.

Example 7: Preparation of Aluminum-Silica Composite Colloid

A starting mixture was prepared by blending the following ingredients: 1500 g $H_2O$, 39.1 g acetic acid, 46 g lactic acid, 377 g aluminum chlorohydrate solution (12.4% Al) and 1500 g of Nalco 1034A (commercial colloidal silica from Nalco, 34.4% solid, 20 nm particle size, pH=4). The mixture was allowed to mix at room temperature for one hour and was then passed through a column filled with insoluble weak-base anionic resin (Diaion WA30, Mitsubishi Chemical Corp., www.dianion.com) in free base form having total capacity of greater than 2.5 moles. The effluent liquid from the column was collected and concentrated by evaporation under reduced pressure to achieve a solids concentration of 35 wt %. The silica-to-alumina ration was determined by XRF to be 10. Ion chromatographic analysis indicated that the chloride concentration in the final product is below 200 ppm. Based on an accelerated aging study, the concentrated sol is stable up to 12 months at room temperature.

Example 8: Preparation of Aluminum-Silica Composite Colloid

A starting mixture was prepared by blending the following ingredients: 1100 g $H_2O$, 34.5 g acetic acid, 498.5 g aluminum chlorohydrate solution (12.4% Al) and 200 g of Nalco 2327 (commercial colloidal silica from Nalco, 40.5% solid, 20 nm particle size, pH=9). The mixture was allowed to mix at room temperature for one hour and was then passed through a column. The column was prepared by filling with insoluble weak-base anion exchange resin (Diaion WA30, Mitsubishi Chemical Corp., www.dianion.com) in freebase form having total capacity of 2.5 moles and pre-conditioning by passing through a mixture of 110 g of acetic acid and 5000 g $H_2O$. The effluent liquid from the column was collected and concentrated by evaporation under reduced pressure to achieve a solids concentration of 35 wt %. The silica-to-alumina ration was determined by XRF to be 10. Ion chromatographic analysis indicated that chloride concentration in the final product is below 200 ppm. Based on an accelerated aging study, the concentrated sol is stable up to 12 months at room temperature.

The structural uniqueness of the above disclosed aluminum-silica composite sols were suggested by their NMR spectra illustrated in FIG. 7, which indicated that the aluminum atoms in the product possess two types coordination environments, tetrahedral indicated by the NMR signal centered around 60 ppm and octahedral indicated by the NMR signal centered around 5 ppm.

Example 9: Synthesis of Zeolite

In this example, 0.88 g NaOH and 1.23 g KOH were mixed with 50 g $H_2O$ and 25 g 25 wt % N,N,N-trimethyl- 1-adamantylammonium hydroxide (AdaOH, Sachem, Inc.). The mixture was stirred until a clear solution was formed. Then, 37 g aluminum-silica composite sol (silica-to-alumina molar ratio: 12.5, solid concentration: 34 wt %) was added under stirring. After stirring for 30 min, 27 g colloidal silica (Nalco 2327, 40.6% $SiO_2$) was added. The final mixture, having a molar composition of 1.0$SiO_2$:0.04 $Al_2O_3$: 0.08AdaOH:0.03$Na_2O$:0.03$K_2O$ was stirred for two more hours and loaded into a reactor (Parr, 300 ml) for crystallization of chabazite. The crystallization was conducted at 160° C. for 15 hours under constant agitation and autogenous pressure. The solid product was recovered by filtration, extensive washing and drying at room temperature. Calcination of the as-crystallized chabazite was conducted at 600° C. for 6 hours under air flow. XRD analysis showed that the solid product has a pure chabazite phase. SEM results illustrated in FIG. 8 and FIG. 9 indicate the crystallized product has a well-defined cubic morphology that falls into a size range of about 1-3 microns. XRF analysis indicated the silica-to-alumina ratio was 25.

Example 10

A $^{27}Al$ NMR spectrum was run of an aqueous solution of a commercial dibasic aluminum acetate combined with an aqueous colloidal silica, and is shown in FIG. 10. Like the $^{27}Al$ NMR spectrum of commercial dibasic aluminum acetate, the spectrum shows Al in predominantly or exclusively octahedral environments, and is quite different from the $^{27}Al$ NMR spectrum of the eluent of the column from Example 2 (FIG. 5). The latter shows a broader peak associated with octahedral environments and also a peak associated with aluminum in a tetrahedral environment between about 50 ppm and about 75 ppm.

Example 11

A sample of an effluent made as described in Example 3 was blended with an aqueous colloidal silica to attempt to duplicate the effluent liquid of any one of Examples 5-8. The combination of the effluent (made as in Example 3) and the aqueous colloidal silica gelled. This suggests that the effluents of Examples 5-8 are different from the effluents of Examples 2 and 3 and cannot be realized by combining the effluents from Example 2 or 3 with colloidal silicas.

Example 12: Synthesis of a Zeolite

Sodium hydroxide (8.74 g) was dissolved in distilled water (45 g) and 20% by weight aqueous adamantylammonium hydroxide (77 g) was mixed in. The mixture was stirred until a clear solution was obtained.
Then, 33 g of an aluminum complex solution made as described in Example 3 but having 14.5% $Al_2O_3$ equivalent was added with stirring. After stirring for 60 min, aqueous colloidal silica (181 g, Nalco 1130, 30.23% silica) was added. The final mixture, having a molar stoichiometry of 1.0 $SiO_2$:0.05 $Al_2O_3$:0.08 AdaOH:0.12 $Na_2O$:16$H_2O$ was stirred for four more hours and loaded into a reactor (Parr, 600 ml) for crystallization of chabazite. The crystallization was conducted at 170° C. for 18 hours under constant agitation and autogenous pressure. The solid product was recovered by filtration, extensive washing and drying at room temperature. Calcination of the solid product was conducted at 600° C. for six hours under air flow. X-ray diffraction analysis showed that the solid product had a pure chabazite phase. Scanning electron microscopy (SEM) was run on the solid product and indicated average zeolite crystal size of 0.2-0.5 micron. Micropore volume, measured by $N_2$-BET, was 0.28 $cm^3/g$. X-ray fluorescence analysis confirmed a silica-to-alumina ratio of 20.

Example 13: Synthesis of a Zeolite Using Conventional Aluminum Acetate Dibasic

Sodium hydroxide (8.74 g) was dissolved in distilled water (65 g) and 20% by weight aqueous adamantylammonium hydroxide (77 g) was mixed in. The mixture was stirred until a clear solution was obtained. Then 13 g aluminum acetate dibasic (Aldrich, 36% $Al_2O_3$ equivalent) was added with stirring. After stirring for 60 min, aqueous colloidal silica (181 g, Nalco 1130, 30.23% silica) was added. The final mixture, having a molar stoichiometry of 1.0 $SiO_2$:0.05 $Al_2O_3$:0.08 AdaOH:0.12 $Na_2O$:16$H_2O$ was stirred for four more hours and loaded into a reactor (Parr, 600 ml) for crystallization of chabazite. The crystallization was conducted at 170° C. for 18 hours under constant agitation and autogenous pressure. The solid product was recovered by filtration, extensive washing and drying at room temperature. Calcination of the solid product was conducted at 600° C. for six hours under air flow. X-ray diffraction analysis showed that the solid product was a mixture of crystalline chabazite phase and amorphous silica. The relative crystallinity, calculated by comparing integrated diffraction intensity of the highest 10 peaks in the XRY profile, was <10% of the that of the product made in Example 12. X-ray fluorescence analysis confirmed a silicato-alumina ratio of 20.

Example 14: Synthesis of a Zeolite Using Conventional Aluminum Sulfate

Sodium hydroxide (14.6 g) was dissolved in distilled water (50 g) and 20% by weight aqueous adamantylammonium hydroxide (77 g) was mixed in. The mixture was stirred until a clear solution was obtained. Then, 13 g aluminum sulfate hexadecahydrate (Aldrich) was added with stirring. After stirring for 60 min, aqueous colloidal silica (181 g, Nalco 1130, 30.23% silica) was added. The final mixture, having a molar stoichiometry of 1.0 $SiO_2$:0.05 $Al_2O_3$:0.08 AdaOH:0.2 $Na_2O$:16 $H_2O$ was stirred for four more hours and loaded into a reactor (Parr, 600 ml) for crystallization of chabazite. The crystallization was conducted at 170° C. for 18 hours under constant agitation and autogenous pressure. The solid product was recovered by filtration, extensive washing and drying at room temperature. Calcination of the solid product was conducted at 600° C. for six hours under air flow. X-ray diffraction analysis showed that the solid product was a mixture of crystalline chabazite phase and amorphous silica. The relative crystallinity, calculated by comparing integrated diffraction intensity of the highest 10 peaks in the XRY profile, was 90% of the that of the product made in Example 12. Micropore volume, measured by $N_2$-BET, was 0.22 $cm^3/g$. X-ray fluorescence analysis confirmed a silica-to-alumina ratio of 20.

While this invention may be embodied in many different forms, there are described in detail herein specific preferred embodiments of the invention. The present disclosure is an exemplification of the principles of the invention and is not intended to limit the invention to the particular embodiments illustrated. All patents, patent applications, scientific papers, and any other referenced materials mentioned herein are incorporated by reference in their entirety. Furthermore, the invention encompasses any possible combination of some or all of the various embodiments mentioned herein, described herein and/or incorporated herein. In addition the invention encompasses any possible combination that also specifically excludes any one or some of the various embodiments mentioned herein, described herein and/or incorporated herein.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described in this disclosure which equivalents are also intended to be encompassed by the claims.

All disclosed ranges and parameters are understood to encompass any and all subranges subsumed therein, and every number between the endpoints. For example, a stated range of "1 to 10" should be considered to include any and all subranges between (and inclusive of) the minimum value of 1 and the maximum value of 10; that is, all subranges beginning with a minimum value of 1 or more, (e.g. 1 to 6.1), and ending with a maximum value of 10 or less, (e.g. 2.3 to 9.4, 3 to 8, 4 to 7), and finally to each number 1, 2, 3, 4, 5, 6, 7, 8, 9, and 10 contained within the range. All percentages, ratios and proportions in this disclosure are by weight unless otherwise specified. Unless otherwise indicated herein molecular weight or MW refers to molecular weight as measured by weight average.

Those skilled in the art may recognize other equivalents to the specific embodiments described in this disclosure which equivalents are intended to be encompassed by the attached claims.

What is claimed is:

1. A method comprising:
   combining in an aqueous blend a water-soluble aluminum salt and a first acid having a pKa of 3.5 to 9.5 to form a first aqueous aluminum complex composition; and
   contacting the first aqueous aluminum complex composition with a water-insoluble anion exchange resin to provide a second aqueous aluminum complex composition.

2. The second aqueous aluminum complex composition of claim 1.

3. The method of claim 1, wherein the water-soluble aluminum salt is aluminum chlorohydrate.

4. The method of claim 1, wherein the method further comprises preconditioning a basic anion exchange resin with a second acid having a pKa of 3.5 to 9.5 to provide the water-insoluble anion exchange resin.

5. The method of claim 4, wherein each of the first acid and the second acid is individually selected from the group consisting of acetic acid, boric acid, lactic acid, and any combination thereof.

6. The method of claim 4, wherein the second acid is acetic acid.

7. The method of claim 1, further comprising, in order:
   optionally diluting or concentrating the second aqueous aluminum complex composition; and
   combining the second aqueous aluminum complex composition with an aqueous alkali, an aqueous colloidal silica, and optionally a structure directing agent to form an aqueous silica-alumina composition, wherein the structure directing agent is selected from the group consisting of N,N,N-trimethyl-1-adamantylammonium hydroxide, tetramethylammonium hydroxide, tetrapropylammonium hydroxide, tetraethylammonium hydroxide, tetrabutylammonium hydroxide, tetrahexylammonium hydroxide, tetraoctylammonium hydroxide, methyltributylammonium hydroxide, methyltriethylammonium hydroxide, phenyltrimethylammonium hydroxide, methyltripropylammonium hydroxide, dodecyltrimethylammonium hydroxide, hexadecyltrimethylammonium hydroxide, N-dodecyl N-ethyl N,N-dimethyl ammonium hydroxide, N,N-dimethyl N,N-diethyl ammonium hydroxide, and any combination thereof.

8. The method of claim 7, wherein silica in the aqueous silica-alumina composition has a particle size of about 3 nm to about 150 nm.

9. The method of claim 7, wherein the aqueous silica-alumina composition includes the structure directing agent, and the structure directing agent is N,N,N-trimethyl-1-adamantylammonium hydroxide.

10. The method of claim 7, wherein the aqueous alkali is selected from the group consisting of aqueous sodium hydroxide, aqueous potassium hydroxide, and a combination thereof.

11. The method of claim 7, the method further comprising heating the aqueous silica-alumina composition under autogenous pressure at a temperature between 100° C. and 250° C. for 12 hours to 24 hours to provide an aqueous zeolite composition comprising an uncalcined zeolite product.

12. The method of claim 11, the method further comprising separating the uncalcined zeolite product from the aqueous zeolite composition, and washing the uncalcined zeolite product.

13. The method of claim 11, the method further comprising heating the uncalcined zeolite product for 1 hour to 12 hours at 400° C. to 1000° C. to provide a calcined zeolite.

14. The method of claim 13, wherein the aqueous silica-alumina composition includes the structure directing agent, the structure directing agent is N,N,N-trimethyl-1-adamantylammonium hydroxide, and the calcined zeolite is a chabazite.

15. The calcined zeolite of claim 13.

16. A method comprising:
   combining in an aqueous blend a water-soluble aluminum salt, a first acid having a pKa of 3.5 to 9.5, and an aqueous colloidal silica to form an aluminum-silica reaction product;
   passing the aluminum-silica reaction product through a fixed bed of a water-insoluble anion exchange resin to provide an aluminum-silica effluent;
   optionally diluting or concentrating the aluminum-silica effluent; and
   combining the aluminum-silica effluent with an aqueous alkali, further aqueous colloidal silica, and optionally a structure directing agent to form an aqueous silica-alumina composition, wherein the structure directing agent is selected from the group consisting of N,N,N-trimethyl-1-adamantylammonium hydroxide, tetramethylammonium hydroxide, tetrapropylammonium hydroxide, tetraethylammonium hydroxide, tetrabutylammonium hydroxide, tetrahexylammonium hydroxide, tetraoctylammonium hydroxide, methyltributylammonium hydroxide, methyltriethylammonium hydroxide, phenyltrimethylammonium hydroxide, methyltripropylammonium hydroxide, dodecyltrimethylammonium hydroxide, hexadecyltrimethylammonium hydroxide, N-dodecyl N-ethyl N,N-dimethyl ammonium hydroxide, N,N-dimethyl N,N-diethyl ammonium hydroxide, and any combination thereof.

17. The method of claim 16, wherein silica in the aqueous silica-alumina composition has a particle size of 3 nm to 150 nm.

18. The method of claim 16, wherein the aqueous silica-alumina composition includes the structure directing agent, and the structure directing agent is N,N,N-trimethyl-1-adamantylammonium hydroxide.

19. The method of claim 16, the method further comprising heating the aqueous silica-alumina composition under autogenous pressure at a temperature between 100° C. and 250° C. for 12 hours to 24 hours to provide an aqueous zeolite composition comprising an uncalcined zeolite product.

20. The method of claim 19, the method further comprising heating the uncalcined zeolite product for 1 hour to 12 hours at 400° C. to 1000° C. to provide a calcined zeolite.

* * * * *